(12) United States Patent
Gurelli et al.

(10) Patent No.: US 12,235,376 B2
(45) Date of Patent: Feb. 25, 2025

(54) DETERMINATION OF POSITION AND ORIENTATION OF AN INTELLIGENT REFLECTING SURFACE

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Tao Luo, San Diego, CA (US); Wooseok Nam, San Diego, CA (US); Yucheng Dai, San Diego, CA (US); Navid Abedini, Basking Ridge, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 643 days.

(21) Appl. No.: 17/485,051

(22) Filed: Sep. 24, 2021

(65) Prior Publication Data
US 2023/0098229 A1 Mar. 30, 2023

(51) Int. Cl.
*G01S 5/06* (2006.01)
*G01S 5/10* (2006.01)
*H04W 64/00* (2009.01)

(52) U.S. Cl.
CPC ............... *G01S 5/06* (2013.01); *G01S 5/10* (2013.01); *H04W 64/006* (2013.01)

(58) Field of Classification Search
CPC ..... H04W 64/00; H04W 24/02; H04W 16/28; H04W 40/22; H04W 4/02; H04W 4/029; H04W 4/023; H04W 84/047; H04W 88/04; H04W 4/33; H04W 40/20; H04W 52/0229; H04W 84/005; H04W 4/026; H04W 88/02; H04W 92/02; H04W 92/10
See application file for complete search history.

(56) References Cited

U.S. PATENT DOCUMENTS

| 11,528,657 | B1 * | 12/2022 | Mangalvedhe | .... H04B 7/04013 |
| 11,728,571 | B2 * | 8/2023 | Alkhateeb | ............ H01Q 15/148 |
| | | | | 343/915 |
| 2016/0269859 | A1 | 9/2016 | Nallampatti Ekambaram et al. | |
| 2021/0302561 | A1 | 9/2021 | Bayesteh et al. | |
| 2022/0014935 | A1 * | 1/2022 | Haija | ................... H04L 5/0048 |
| 2022/0052764 | A1 * | 2/2022 | Medra | ................. H04B 10/614 |

* cited by examiner

*Primary Examiner* — Kwasi Karikari
(74) *Attorney, Agent, or Firm* — QUALCOMM Incorporated

(57) ABSTRACT

Disclosed are techniques for wireless communication. In an aspect, a position estimation entity determines a set of position estimates associated with a set of user equipments (UEs), obtains first measurement information associated with a set of signals as reflected off of a target intelligent reflecting surface (IRS), determines a position estimate of the target IRS based on the set of position estimates and the first measurement information, and determines an orientation, relative to a common orientation reference frame, of the target IRS based on the set of position estimates and at least the first measurement information.

30 Claims, 18 Drawing Sheets

DETERMINATION OF POSITION AND ORIENTATION OF AN INTELLIGENT REFLECTING SURFACE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a position estimation entity includes determining a set of position estimates associated with a set of user equipments (UEs); obtaining first measurement information associated with a set of signals as reflected off of a target intelligent reflecting surface (IRS); determining a position estimate of the target IRS based on the set of position estimates and the first measurement information; and determining an orientation, relative to a common orientation reference frame, of the target IRS based on the set of position estimates and at least the first measurement information.

In an aspect, a position estimation entity includes a memory; at least one transceiver; and at least one processor communicatively coupled to the memory and the at least one transceiver, the at least one processor configured to: determine a set of position estimates associated with a set of user equipments (UEs); obtain first measurement information associated with a set of signals as reflected off of a target intelligent reflecting surface (IRS); determine a position estimate of the target IRS based on the set of position estimates and the first measurement information; and determine an orientation, relative to a common orientation reference frame, of the target IRS based on the set of position estimates and at least the first measurement information.

In an aspect, a position estimation entity includes means for determining a set of position estimates associated with a set of user equipments (UEs); means for obtaining first measurement information associated with a set of signals as reflected off of a target intelligent reflecting surface (IRS); means for determining a position estimate of the target IRS based on the set of position estimates and the first measurement information; and means for determining an orientation, relative to a common orientation reference frame, of the target IRS based on the set of position estimates and at least the first measurement information.

In an aspect, a non-transitory computer-readable medium storing computer-executable instructions that, when executed by a position estimation entity, cause the position estimation entity to: determine a set of position estimates associated with a set of user equipments (UEs); obtain first measurement information associated with a set of signals as reflected off of a target intelligent reflecting surface (IRS); determine a position estimate of the target IRS based on the set of position estimates and the first measurement information; and determine an orientation, relative to a common orientation reference frame, of the target IRS based on the set of position estimates and at least the first measurement information.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
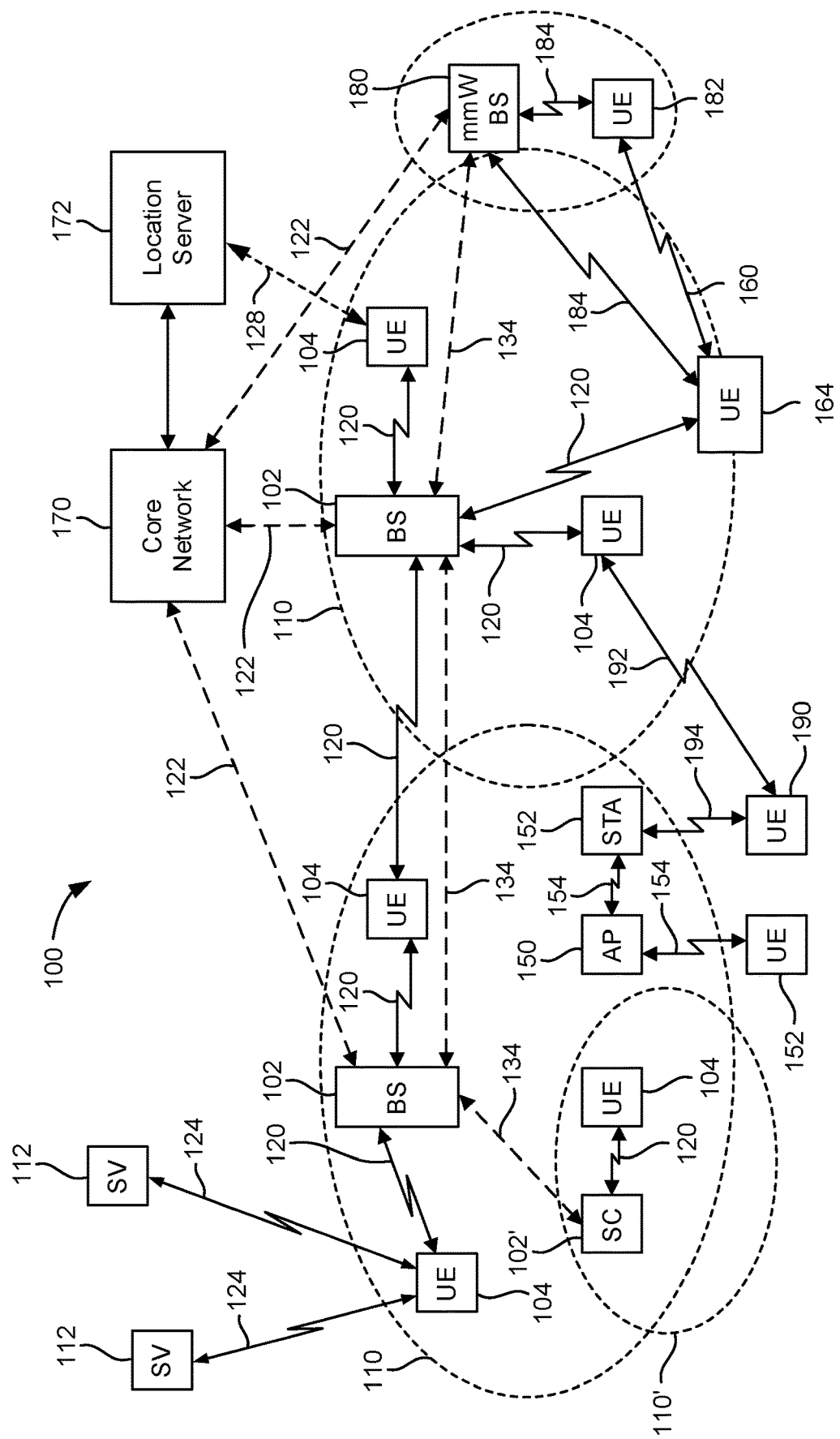
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz- 7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
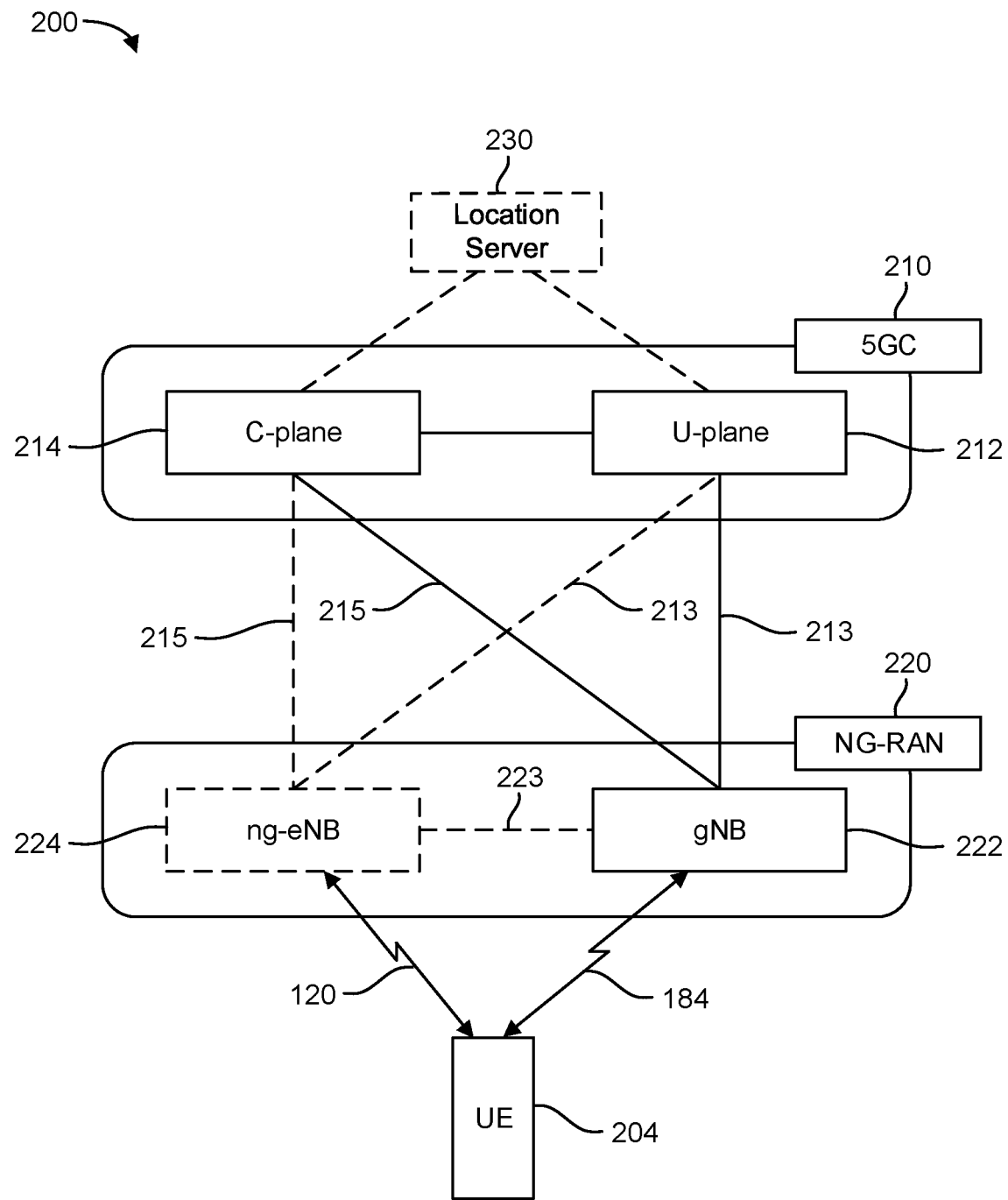
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
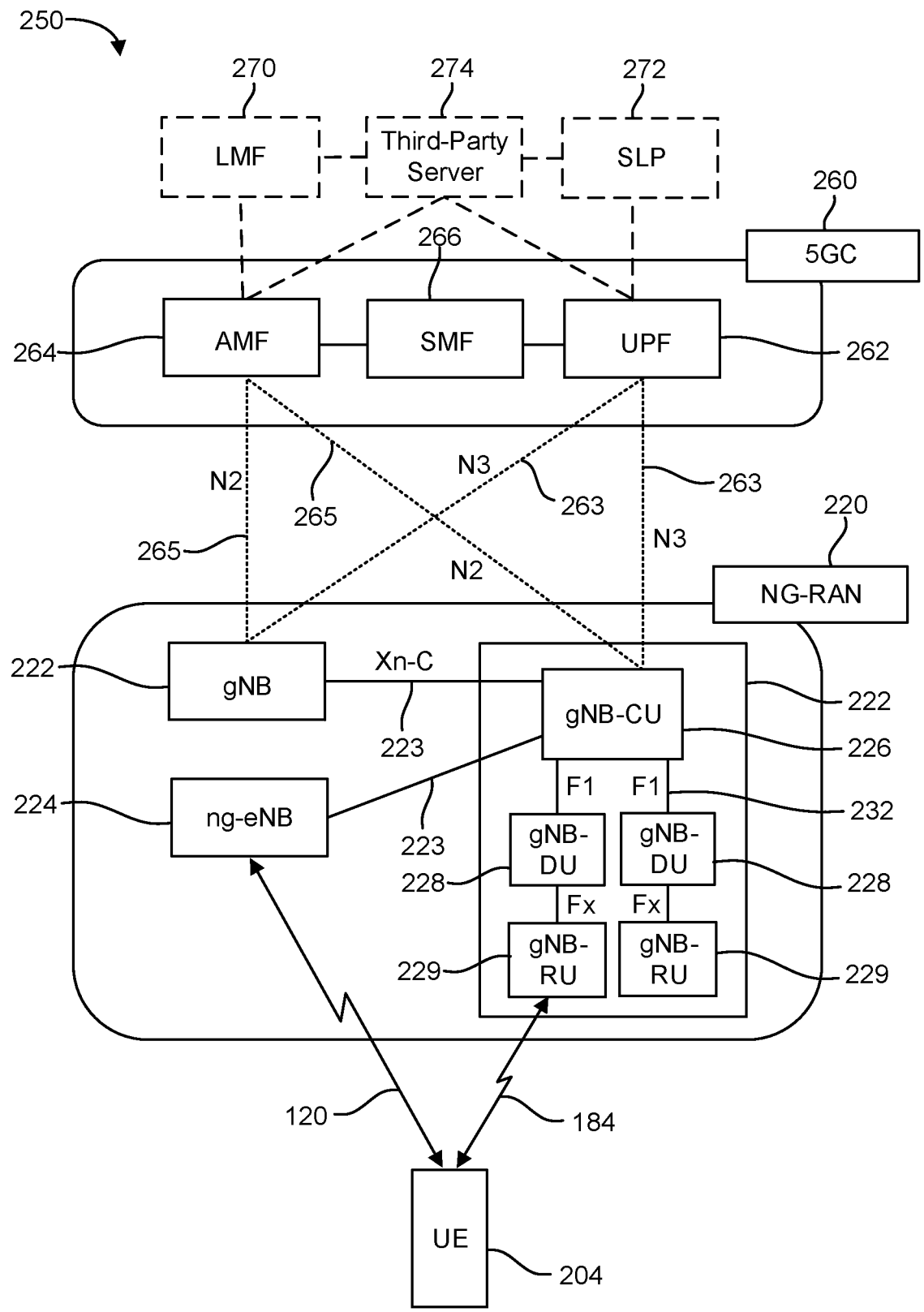

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
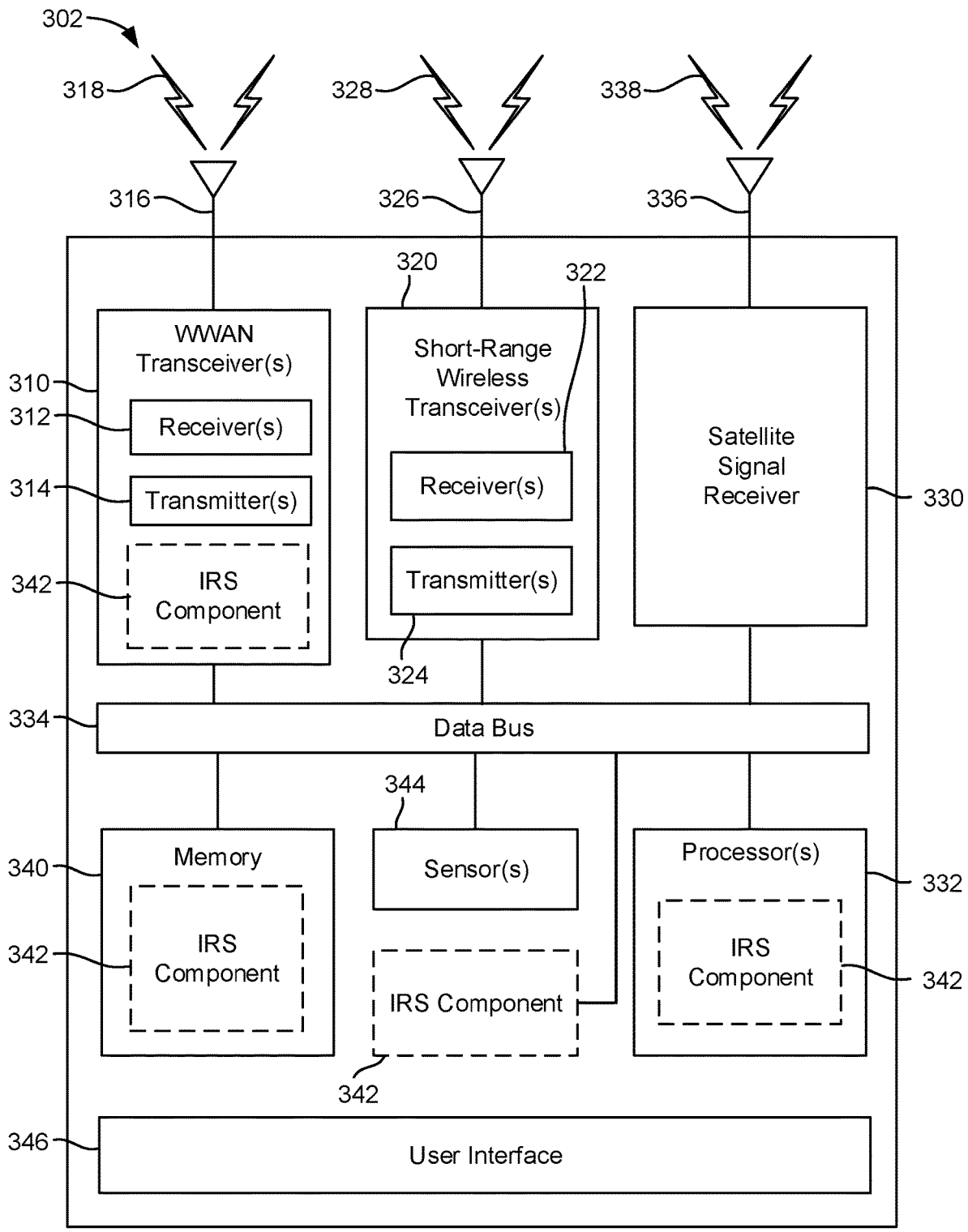
FIGS. 3A, 3B, and 3C are simplified block diagrams of several sample aspects of components that may be employed in a user equipment (UE), a base station, and a network entity, respectively, and configured to support communications as taught herein.
Figure 3B:
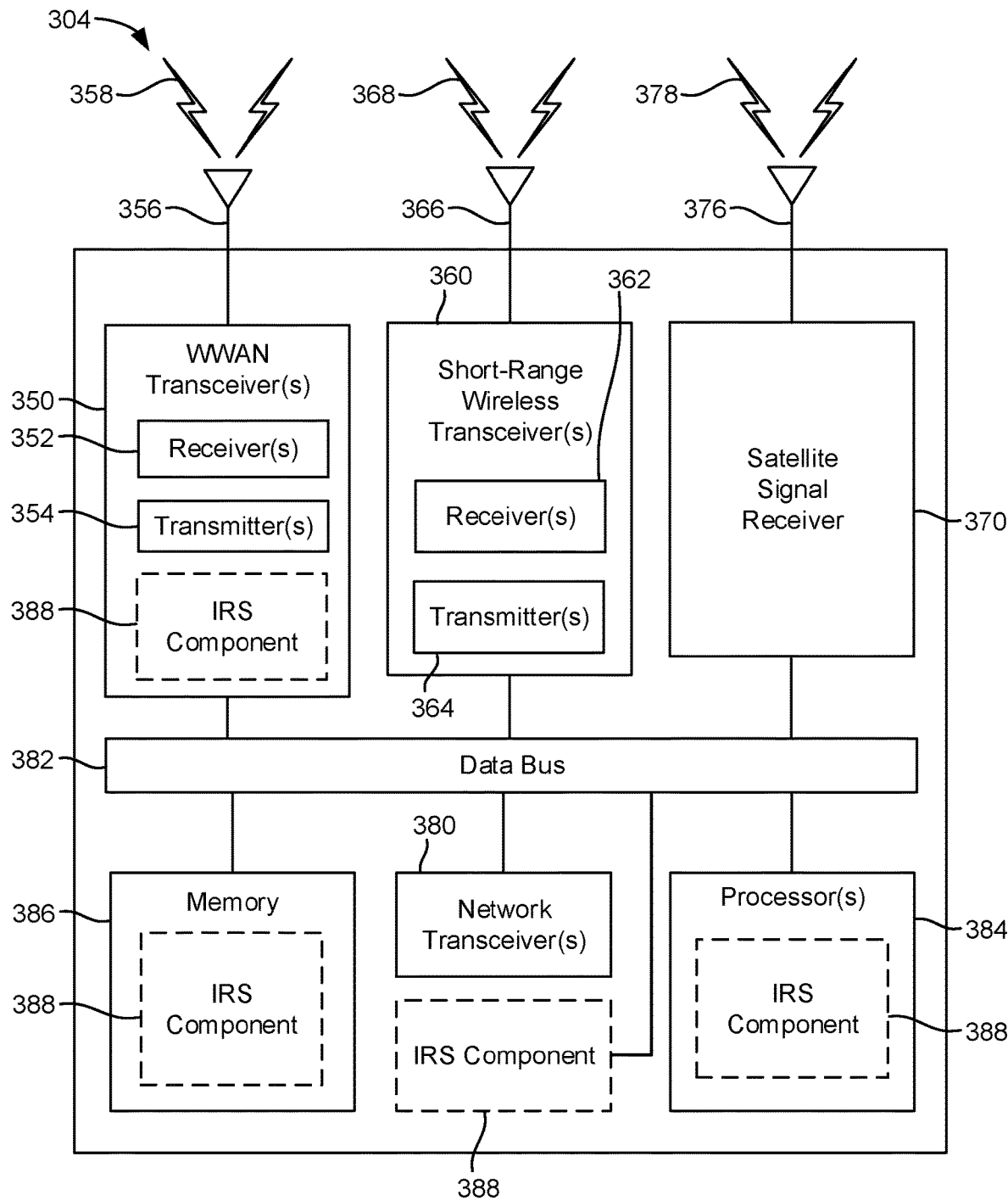
Figure 3C:
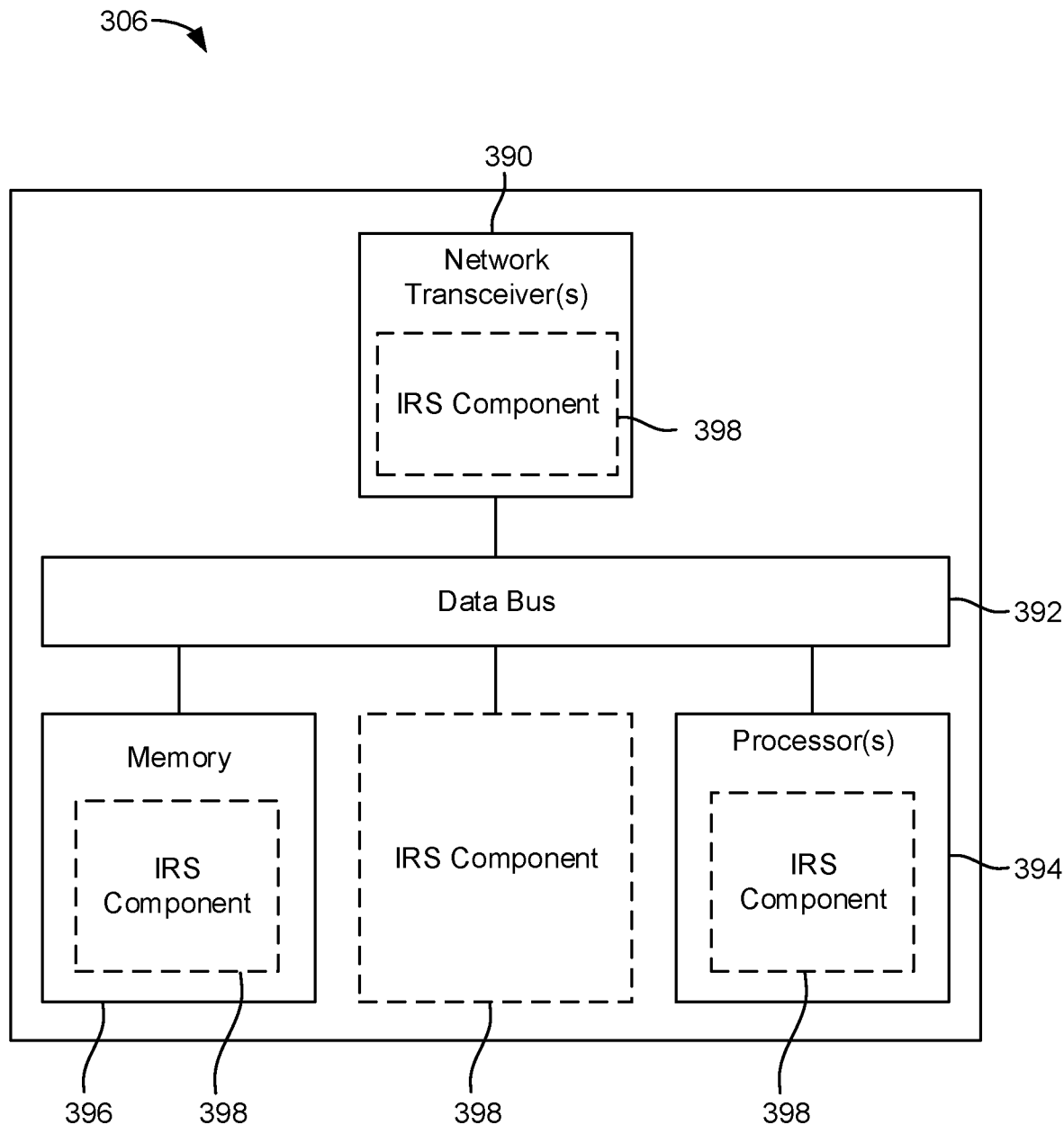

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include IRS component 342, 388, and 398, respectively. The IRS component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the IRS component 342, 388, and 398 may be external to the processors 332, 384, and 394 (e.g., part of a modem processing system, integrated with another processing system, etc.). Alternatively, the IRS component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the IRS component 342, which may be, for example, part of the one or more WWAN transceivers 310, the memory 340, the one or more processors 332, or any combination thereof, or may be a standalone component. FIG. 3B illustrates possible locations of the IRS component 388, which may be, for example, part of the one or more WWAN transceivers 350, the memory 386, the one or more processors 384, or any combination thereof, or may be a standalone component. FIG. 3C illustrates possible locations of the IRS component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the IRS component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
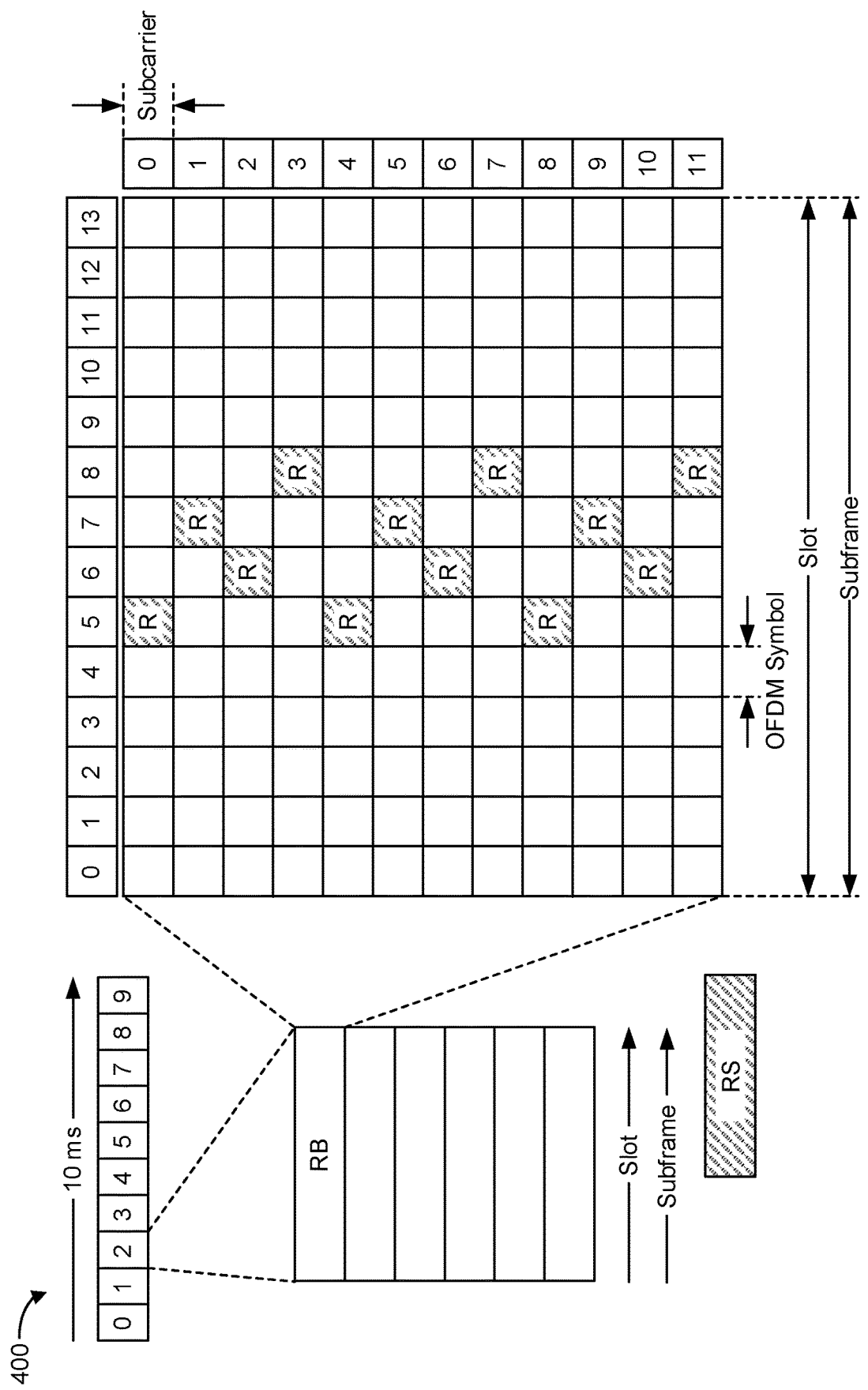
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu s$), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu s$, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu s$, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu s$, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu s$, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

Figure 5:
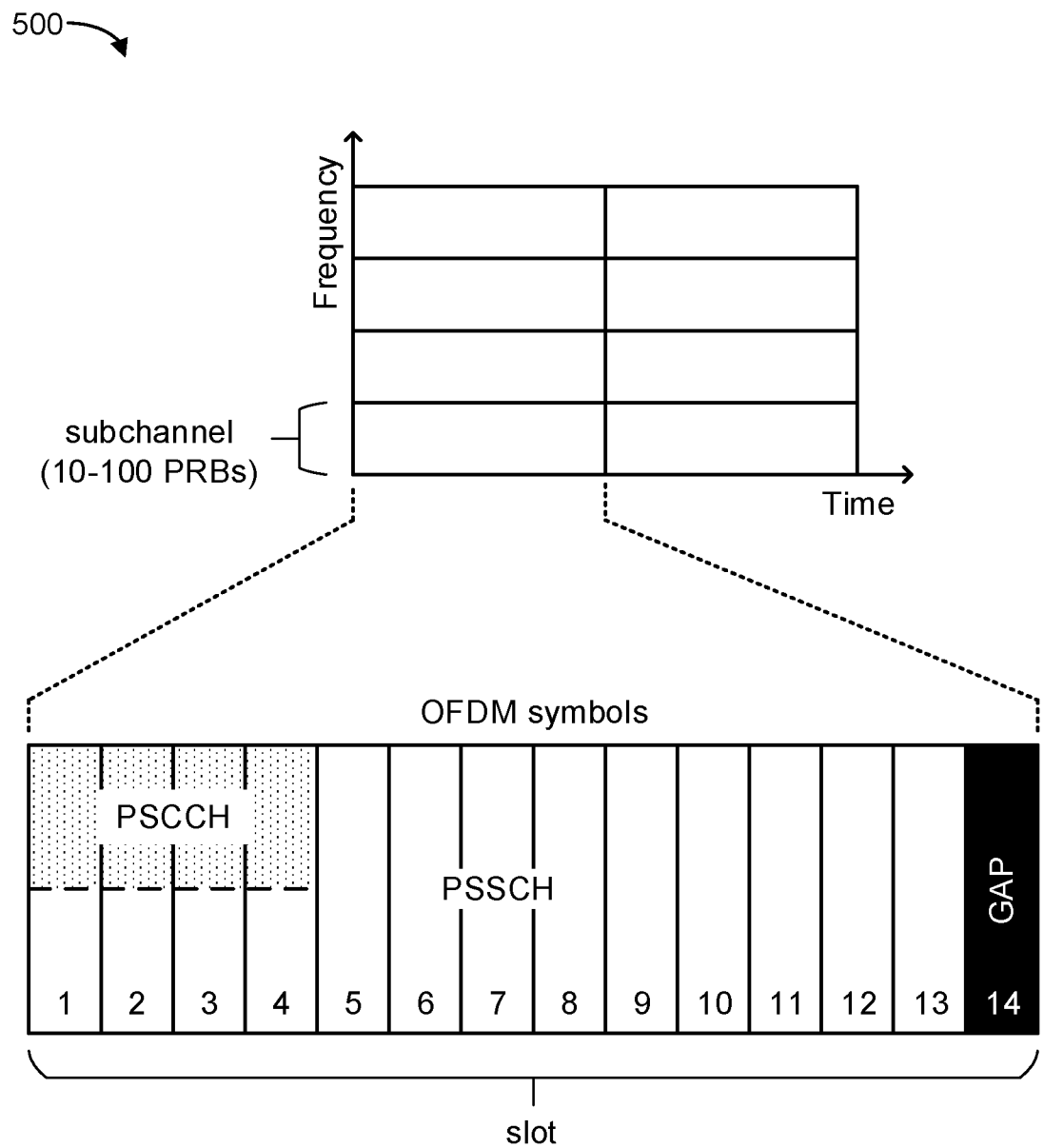
FIG. 5 illustrates time and frequency resources used for sidelink communication.

FIG. 5 illustrates time and frequency resources used for sidelink communication. A time-frequency grid 500 is divided into subchannels in the frequency domain and is divided into time slots in the time domain. Each subchannel comprises a number (e.g., 10, 15, 20, 25, 50, 75, or 100) of physical resource blocks (PRBs), and each slot contains a number (e.g., 14) of OFDM symbols. A sidelink communication can be (pre)configured to occupy fewer than 14 symbols in a slot. The first symbol of the slot is repeated on the preceding symbol for automatic gain control (AGC) settling. The example slot shown in FIG. 4 contains a physical sidelink control channel (PSCCH) portion and a physical sidelink shared channel (PSSCH) portion, with a gap symbol following the PSCCH. PSCCH and PSSCH are transmitted in the same slot.

Sidelink communications take place within transmission or reception resource pools. Sidelink communications occupy one slot and one or more subchannels. Some slots are not available for sidelink, and some slots contain feedback resources. Sidelink communication can be preconfigured (e.g., preloaded on a UE) or configured (e.g., by a base station via RRC).

Figure 6:
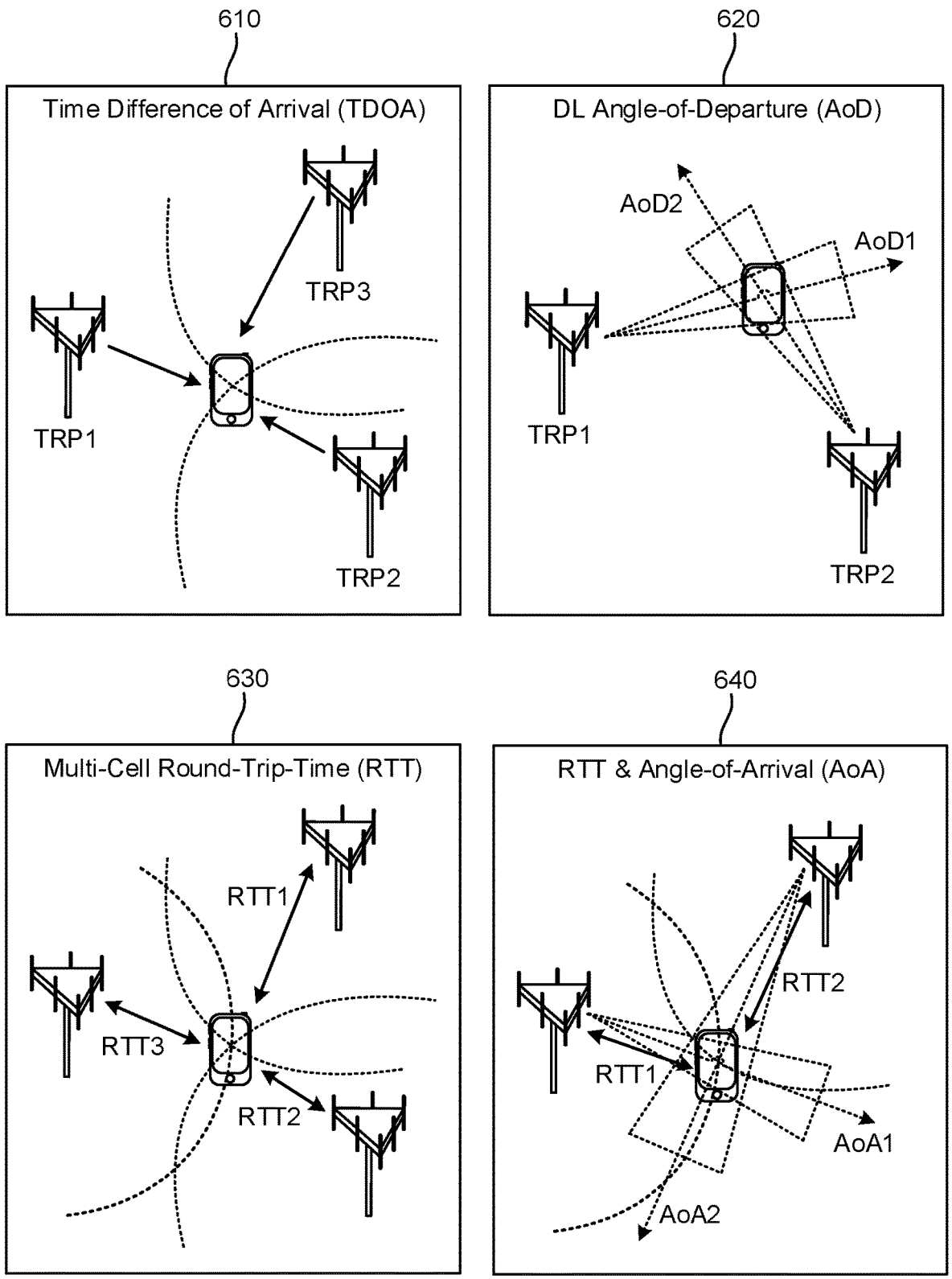
FIG. 6 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 6 illustrates examples of various positioning methods, according to aspects of the disclosure. In an OTDOA or DL-TDOA positioning procedure, illustrated by scenario 610, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 620, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 630, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 640.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 7:
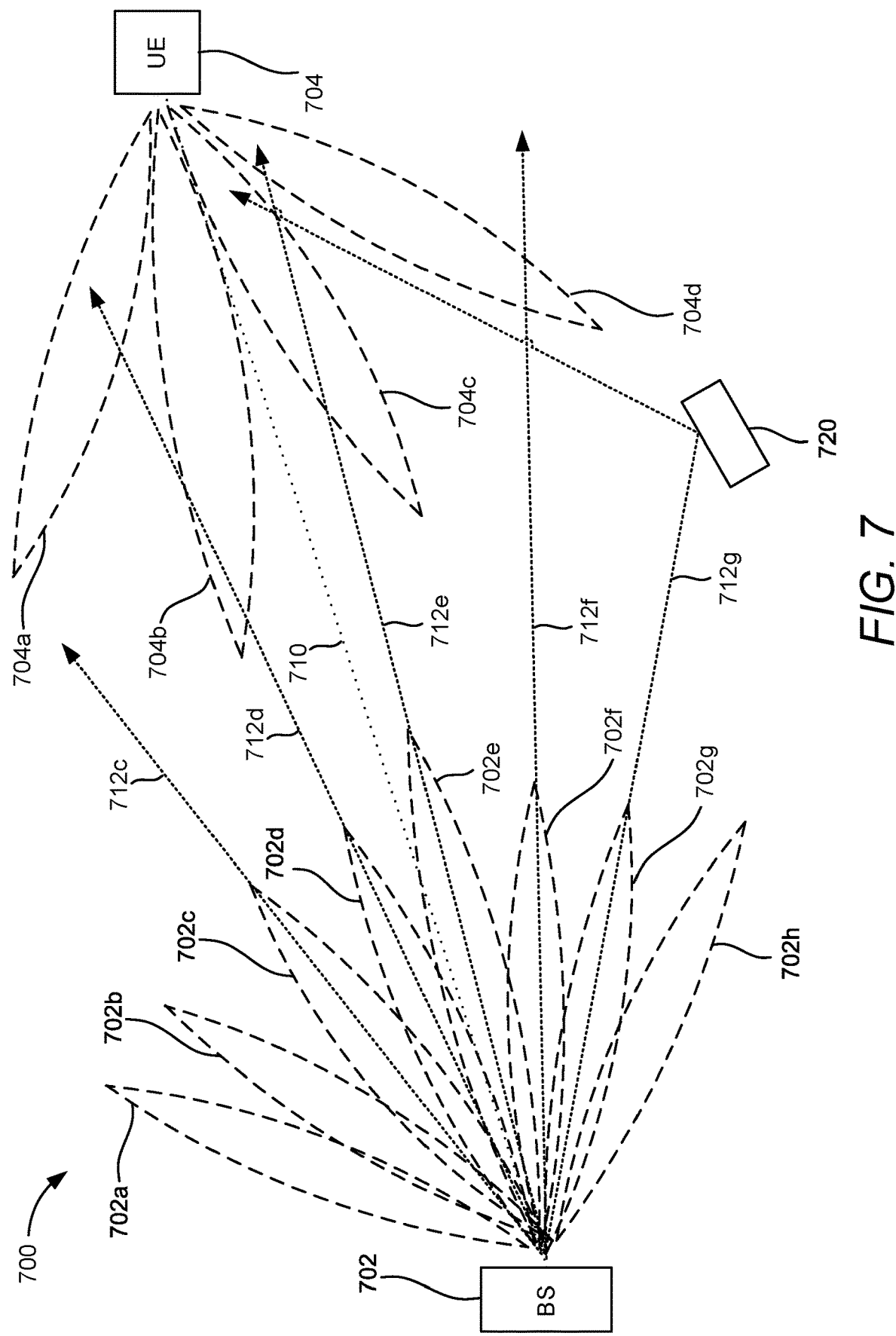
FIG. 7 is a diagram illustrating an example base station in communication with an example UE, according to aspects of the disclosure.

FIG. 7 is a diagram 700 illustrating a base station (B S) 702 (which may correspond to any of the base stations described herein) in communication with a UE 704 (which may correspond to any of the UEs described herein). Referring to FIG. 7, the base station 702 may transmit a beamformed signal to the UE 704 on one or more transmit beams 702a, 702b, 702c, 702d, 702e, 702f, 702g, 702h, each having a beam identifier that can be used by the UE 704 to identify the respective beam. Where the base station 702 is beamforming towards the UE 704 with a single array of antennas (e.g., a single TRP/cell), the base station 702 may perform a "beam sweep" by transmitting first beam 702a, then beam 702b, and so on until lastly transmitting beam 702h. Alternatively, the base station 702 may transmit beams 702a-702h in some pattern, such as beam 702a, then beam 702h, then beam 702b, then beam 702g, and so on. Where the base station 702 is beamforming towards the UE 704 using multiple arrays of antennas (e.g., multiple TRPs/cells), each antenna array may perform a beam sweep of a subset of the beams 702a-702h. Alternatively, each of beams 702a-702h may correspond to a single antenna or antenna array.

FIG. 7 further illustrates the paths 712c, 712d, 712e, 712f, and 712g followed by the beamformed signal transmitted on beams 702c, 702d, 702e, 702f, and 702g, respectively. Each path 712c, 712d, 712e, 712f, 712g may correspond to a single "multipath" or, due to the propagation characteristics of radio frequency (RF) signals through the environment, may be comprised of a plurality (a cluster) of "multipaths." Note that although only the paths for beams 702c-702g are shown, this is for simplicity, and the signal transmitted on each of beams 702a-702h will follow some path. In the example shown, the paths 712c, 712d, 712e, and 712f are straight lines, while path 712g reflects off an obstacle 720 (e.g., a building, vehicle, terrain feature, etc.).

The UE 704 may receive the beamformed signal from the base station 702 on one or more receive beams 704a, 704b, 704c, 704d. Note that for simplicity, the beams illustrated in FIG. 7 represent either transmit beams or receive beams, depending on which of the base station 702 and the UE 704 is transmitting and which is receiving. Thus, the UE 704 may also transmit a beamformed signal to the base station 702 on one or more of the beams 704a-704d, and the base station 702 may receive the beamformed signal from the UE 704 on one or more of the beams 702a-702h.

In an aspect, the base station 702 and the UE 704 may perform beam training to align the transmit and receive beams of the base station 702 and the UE 704. For example, depending on environmental conditions and other factors, the base station 702 and the UE 704 may determine that the best transmit and receive beams are 702d and 704b, respectively, or beams 702e and 704c, respectively. The direction of the best transmit beam for the base station 702 may or may not be the same as the direction of the best receive beam, and likewise, the direction of the best receive beam for the UE 704 may or may not be the same as the direction of the best transmit beam. Note, however, that aligning the transmit and receive beams is not necessary to perform a downlink angle-of-departure (DL-AoD) or uplink angle-of-arrival (UL-AoA) positioning procedure.

To perform a DL-AoD positioning procedure, the base station 702 may transmit reference signals (e.g., PRS, CRS, TRS, CSI-RS, PSS, SSS, etc.) to the UE 704 on one or more of beams 702a-702h, with each beam having a different transmit angle. The different transmit angles of the beams will result in different received signal strengths (e.g., RSRP, RSRQ, SINR, etc.) at the UE 704. Specifically, the received signal strength will be lower for transmit beams 702a-702h that are further from the line of sight (LOS) path 710 between the base station 702 and the UE 704 than for transmit beams 702a-702h that are closer to the LOS path 710.

In the example of FIG. 7, if the base station 702 transmits reference signals to the UE 704 on beams 702c, 702d, 702e, 702f, and 702g, then transmit beam 702e is best aligned with the LOS path 710, while transmit beams 702c, 702d, 702f, and 702g are not. As such, beam 702e is likely to have a higher received signal strength at the UE 704 than beams 702c, 702d, 702f, and 702g. Note that the reference signals transmitted on some beams (e.g., beams 702c and/or 702f) may not reach the UE 704, or energy reaching the UE 704 from these beams may be so low that the energy may not be detectable or at least can be ignored.

The UE 704 can report the received signal strength, and optionally, the associated measurement quality, of each measured transmit beam 702c-702g to the base station 702, or alternatively, the identity of the transmit beam having the highest received signal strength (beam 702e in the example of FIG. 7). Alternatively or additionally, if the UE 704 is also engaged in a round-trip-time (RTT) or time-difference of arrival (TDOA) positioning session with at least one base station 702 or a plurality of base stations 702, respectively, the UE 704 can report reception-to-transmission (Rx-Tx) time difference or reference signal time difference (RSTD) measurements (and optionally the associated measurement qualities), respectively, to the serving base station 702 or other positioning entity. In any case, the positioning entity (e.g., the base station 702, a location server, a third-party client, UE 704, etc.) can estimate the angle from the base station 702 to the UE 704 as the AoD of the transmit beam having the highest received signal strength at the UE 704, here, transmit beam 702e.

In one aspect of DL-AoD-based positioning, where there is only one involved base station 702, the base station 702 and the UE 704 can perform a round-trip-time (RTT) procedure to determine the distance between the base station 702 and the UE 704. Thus, the positioning entity can determine both the direction to the UE 704 (using DL-AoD positioning) and the distance to the UE 704 (using RTT positioning) to estimate the location of the UE 704. Note that the AoD of the transmit beam having the highest received signal strength does not necessarily lie along the LOS path 710, as shown in FIG. 7. However, for DL-AoD-based positioning purposes, it is assumed to do so.

In another aspect of DL-AoD-based positioning, where there are multiple involved base stations 702, each involved base station 702 can report, to the serving base station 702, the determined AoD from the respective base station 702 to the UE 704, or the RSRP measurements. The serving base station 702 may then report the AoDs or RSRP measurements from the other involved base station(s) 702 to the positioning entity (e.g., UE 704 for UE-based positioning or a location server for UE-assisted positioning). With this information, and knowledge of the base stations' 702 geographic locations, the positioning entity can estimate a location of the UE 704 as the intersection of the determined AoDs. There should be at least two involved base stations 702 for a two-dimensional (2D) location solution, but as will be appreciated, the more base stations 702 that are involved in the positioning procedure, the more accurate the estimated location of the UE 704 will be.

To perform an UL-AoA positioning procedure, the UE 704 transmits uplink reference signals (e.g., UL-PRS, SRS, DMRS, etc.) to the base station 702 on one or more of uplink transmit beams 704a-704d. The base station 702 receives the uplink reference signals on one or more of uplink receive beams 702a-702h. The base station 702 determines the angle of the best receive beams 702a-702h used to receive the one or more reference signals from the UE 704 as the AoA from the UE 704 to itself. Specifically, each of the receive beams 702a-702h will result in a different received signal strength (e.g., RSRP, RSRQ, SINR, etc.) of the one or more reference signals at the base station 702. Further, the channel impulse response of the one or more reference signals will be smaller for receive beams 702a-702h that are further from the actual LOS path between the base station 702 and the UE 704 than for receive beams 702a-702h that are closer to the LOS path. Likewise, the received signal strength will be lower for receive beams 702a-702h that are further from the LOS path than for receive beams 702a-702h that are closer to the LOS path. As such, the base station 702 identifies the receive beam 702a-702h that results in the highest received signal strength and, optionally, the strongest channel impulse response, and estimates the angle from itself to the UE 704 as the AoA of that receive beam 702a-702h. Note that as with DL-AoD-based positioning, the AoA of the receive beam 702a-702h resulting in the highest received signal strength (and strongest channel impulse response if measured) does not necessarily lie along the LOS path 710. However, for UL-AoA-based positioning purposes in FR2, it may be assumed to do so.

Note that while the UE 704 is illustrated as being capable of beamforming, this is not necessary for DL-AoD and UL-AoA positioning procedures. Rather, the UE 704 may receive and transmit on an omni-directional antenna.

Where the UE 704 is estimating its location (i.e., the UE is the positioning entity), it needs to obtain the geographic location of the base station 702. The UE 704 may obtain the location from, for example, the base station 702 itself or a location server (e.g., location server 230, LMF 270, SLP 272). With the knowledge of the distance to the base station 702 (based on the RTT or timing advance), the angle between the base station 702 and the UE 704 (based on the UL-AoA of the best receive beam 702a-702h), and the known geographic location of the base station 702, the UE 704 can estimate its location.

Alternatively, where a positioning entity, such as the base station 702 or a location server, is estimating the location of the UE 704, the base station 702 reports the AoA of the receive beam 702a-702h resulting in the highest received signal strength (and optionally strongest channel impulse response) of the reference signals received from the UE 704, or all received signal strengths and channel impulse responses for all receive beams 702 (which allows the positioning entity to determine the best receive beam 702a-702h). The base station 702 may additionally report the Rx-Tx time difference to the UE 704. The positioning entity can then estimate the location of the UE 704 based on the UE's 704 distance to the base station 702, the AoA of the identified receive beam 702a-702h, and the known geographic location of the base station 702.

Figure 8:
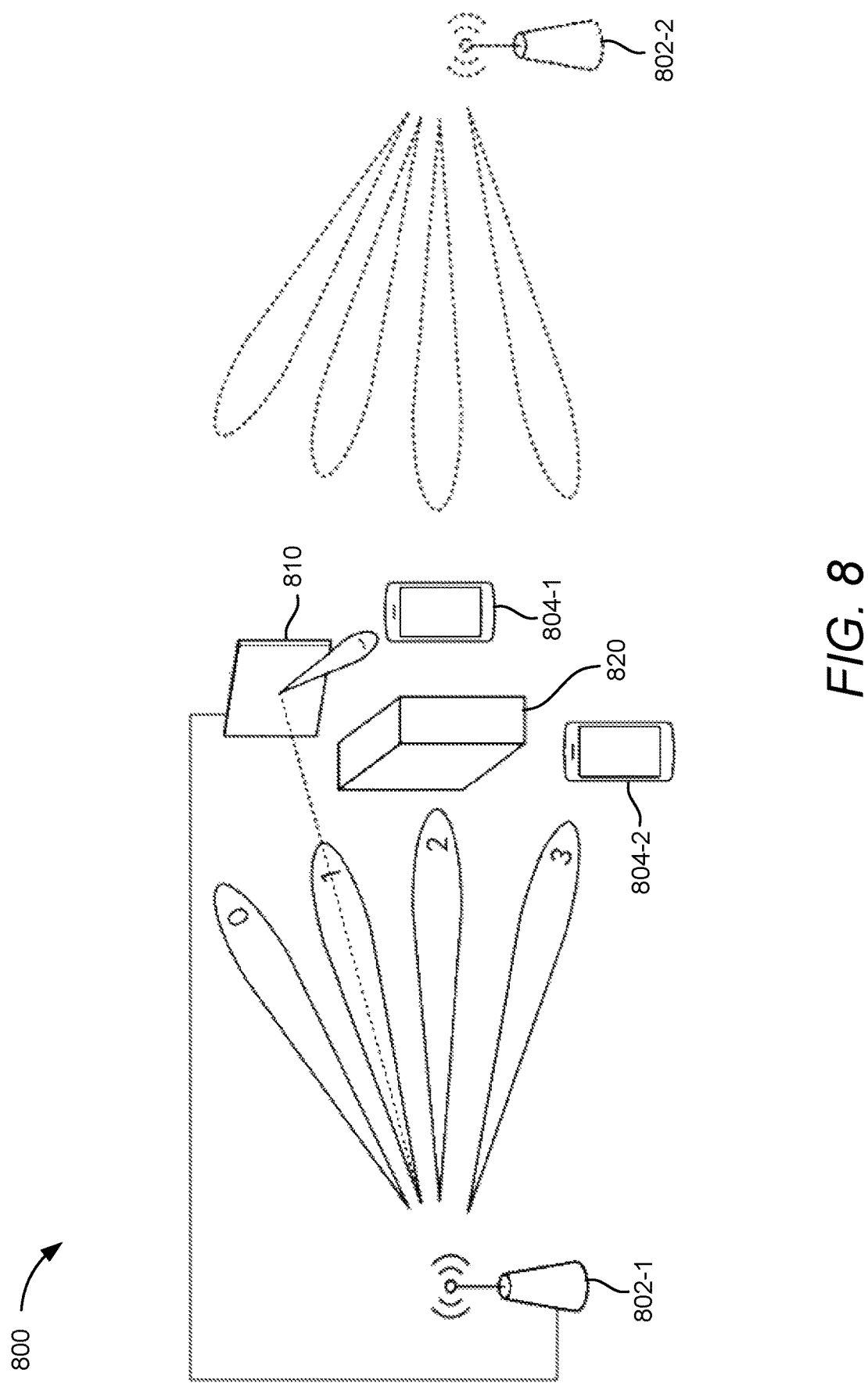
FIG. 8 illustrates an example system for wireless communication using an intelligent reflecting surface (IRS), according to aspects of the disclosure.

FIG. 8 illustrates an example system 800 for wireless communication using an intelligent reflecting surface (IRS) 810, according to aspects of the disclosure. As used herein, an "IRS" may alternatively be referred to as a reconfigurable intelligent surface (RIS), An IRS (e.g., IRS 810) is a two-dimensional surface comprising a large number of low-cost, low-power near-passive reflecting elements whose properties are reconfigurable (by software) rather than static. For example, by carefully tuning the phase shifts of the reflecting elements (using software), the scattering, absorption, reflection, and diffraction properties of an IRS can be changed over time. In that way, the electromagnetic (EM) properties of an IRS can be engineered to collect wireless signals from a transmitter (e.g., a base station, a UE, etc.) and passively beamform them towards a target receiver (e.g., another base station, another UE, etc.). In the example of FIG. 8, a first base station 802-1 controls the reflective properties of an IRS 810 in order to communicate with a first UE 804-1.

The goal of IRS technology is to create smart radio environments, where the wireless propagation conditions are co-engineered with the physical layer signaling. This enhanced functionality of the system 800 can provide technical benefits in a number of scenarios.

As a first example scenario, as shown in FIG. 8, the first base station 802-1 (e.g., any of the base station described herein) is attempting to transmit downlink wireless signals to the first UE 804-1 and a second UE 804-2 (e.g., any two of the UEs described herein, collectively, UEs 804) on a plurality of downlink transmit beams, labeled "0," "1," "2," and "3." However, unlike the second UE 804-2, because the first UE 804-1 is behind an obstacle 820 (e.g., a building, a hill, or another type of obstacle), it cannot receive the wireless signal on what would otherwise be the line-of-sight (LOS) beam from the first base station 802-1, that is, the downlink transmit beam labeled "2." In this scenario, the first base station 802-1 may instead use the downlink transmit beam labeled "1" to transmit the wireless signal to the IRS 810, and configure the IRS 810 to reflect/beamform the incoming wireless signal towards the first UE 804-1. The first base station 802-1 can thereby transmit the wireless signal around the obstacle 820.

Note that the first base station 802-1 may also configure the IRS 810 for the first UE's 804-1 use in the uplink. In that case, the first base station 802-1 may configure the IRS 810 to reflect an uplink signal from the first UE 804-1 to the first base station 802-1, thereby enabling the first UE 804-1 to transmit the uplink signal around the obstacle 820.

As another example scenario in which system 800 can provide a technical advantage, the first base station 802-1 may be aware that the obstacle 820 may create a "dead zone," that is, a geographic area in which the downlink wireless signals from the first base station 802-1 are too attenuated to be reliably detected by a UE within that area (e.g., the first UE 804-1). In this scenario, the first base station 802-1 may configure the IRS 810 to reflect downlink wireless signals into the dead zone in order to provide coverage to UEs that may be located there, including UEs about which the first base station 802-1 is not aware.

An IRS (e.g., IRS 810) may be designed to operate in either a first mode (referred to as "Mode 1"), in which the IRS operates as a reconfigurable mirror, or a second mode (referred to as "Mode 2"), in which the IRS operates as a receiver and transmitter (similar to the amplify and forward functionality of a relay node). Some IRS may be designed to be able to operate in either Mode 1 or Mode 2, while other IRS may be designed to operate only in either Mode 1 or Mode 2. Mode 1 IRS are assumed to have a negligible hardware group delay, whereas Mode 2 IRS have a non-negligible hardware group delay due to being equipped with limited baseband processing capability. Because of their greater processing capability compared to Mode 1 IRS, Mode 2 IRS may, in some cases, be able to compute and report their transmission-to-reception (Tx-Rx) time difference measurements (i.e., the difference between the time a signal is reflected towards a UE and the time the signal is received back from the UE). In the example of FIG. 8, the IRS 810 may be either a Mode 1 or Mode 2 IRS.

FIG. 8 also illustrates a second base station 802-2 that may transmit downlink wireless signals to one or both of the UEs 804. As an example, the first base station 802-1 may be a serving base station for the UEs 804 and the second base station 802-2 may be a neighboring base station. The second base station 802-2 may transmit downlink positioning reference signals to one or both of the UEs 804 as part of a positioning procedure involving the UE(s) 804. Alternatively or additionally, the second base station 802-2 may be a secondary cell for one or both of the UEs 804. In some cases, the second base station 802-2 may also be able to reconfigure the IRS 810, provided it is not being controlled by the first base station 802-1 at the time.

Note that while FIG. 8 illustrates one IRS 810 and one base station controlling the IRS 810 (i.e., the first base station 802-1), the first base station 802-1 may control multiple IRS 810. In addition, the IRS 810 may be controlled by multiple base stations 802 (e.g., both the first and second base stations 802-1 and 802-2, and possibly more).

Figure 9:
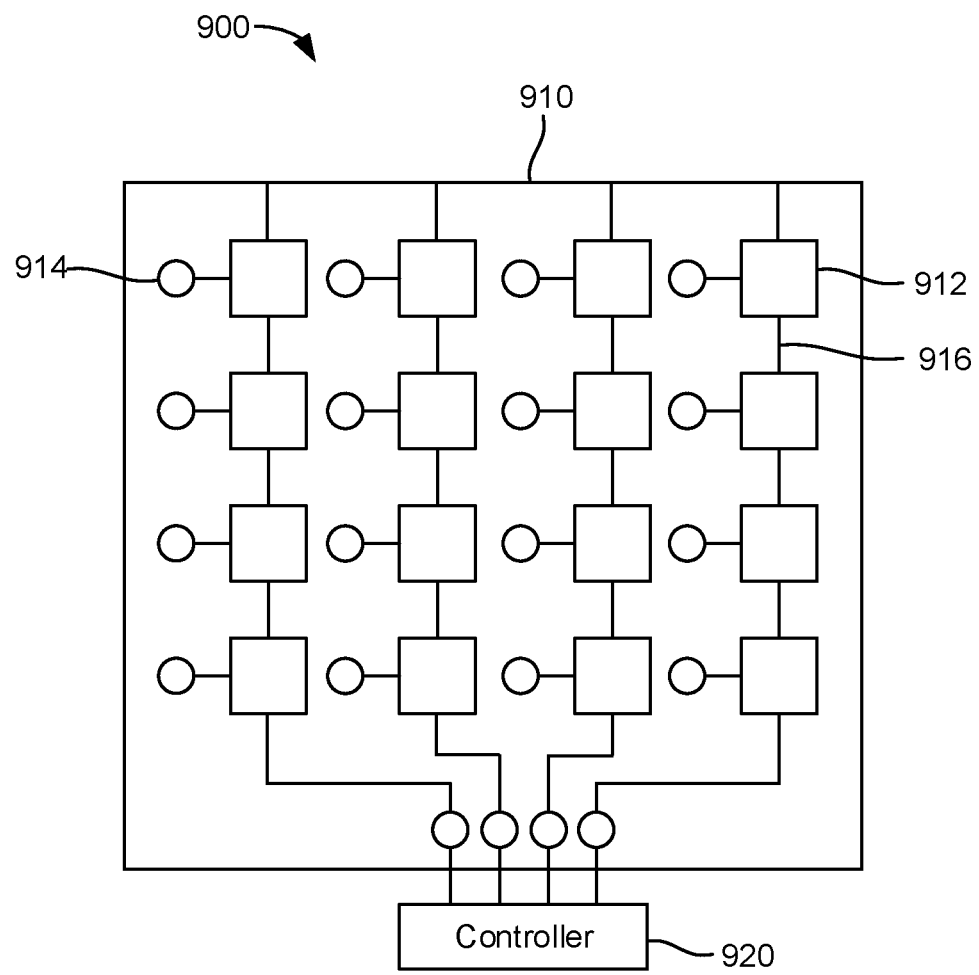
FIG. 9 is a diagram of an example architecture of an IRS, according to aspects of the disclosure.

FIG. 9 is a diagram of an example architecture of an IRS 900, according to aspects of the disclosure. The IRS 900, which may correspond to IRS 810 in FIG. 8, may be a Mode 1 IRS. As shown in FIG. 9, the IRS 900 primarily consists of a planar surface 910 and a controller 920. The planar surface 910 may be constructed of one or more layers of material. In the example of FIG. 9, the planar surface 910 may consist of three layers. In this case, the outer layer has a large number of reflecting elements 912 printed on a dielectric substrate to directly act on the incident signals. The middle layer is a copper panel to avoid signal/energy leakage. The last layer is a circuit board that is used for tuning the reflection coefficients of the reflecting elements 912 and is operated by the controller 920. The controller 920 may be a low-power processor, such as a field-programmable gate array (FPGA).

In a typical operating scenario, the optimal reflection coefficients of the IRS 900 is calculated at the base station (e.g., the first base station 802-1 in FIG. 8), and then sent to the controller 920 through a dedicated feedback link. The design of the reflection coefficients depends on the channel state information (CSI), which is only updated when the CSI changes, which is on a much longer time scale than the data symbol duration. As such, low-rate information exchange is sufficient for the dedicated control link, which can be implemented using low-cost copper lines or simple cost-efficient wireless transceivers.

Each reflecting element 912 is coupled to a positive-intrinsic negative (PIN) diode 914. In addition, a biasing line 916 connects each reflecting element 912 in a column to the controller 920. By controlling the voltage through the biasing line 916, the PIN diodes 914 can switch between 'on' and 'off' modes. This can realize a phase shift difference of π (pi) in radians. To increase the number of phase shift levels, more PIN diodes 914 can be coupled to each reflecting element 912.

An IRS, such as IRS 900, has important advantages for practical implementations. For example, the reflecting elements 912 only passively reflect the incoming signals without any sophisticated signal processing operations that would require RF transceiver hardware. As such, compared to conventional active transmitters, the IRS 900 can operate with several orders of magnitude lower cost in terms of hardware and power consumption. Additionally, due to the passive nature of the reflecting elements 912, an IRS 900 can be fabricated with light weight and limited layer thickness, and as such, can be readily installed on a wall, a ceiling, signage, a street lamp, etc. Further, the IRS 900 naturally operates in full-duplex (FD) mode without self-interference or introducing thermal noise. Therefore, it can achieve higher spectral efficiency than active half-duplex (HD) relays, despite their lower signal processing complexity than that of active FD relays requiring sophisticated self-interference cancelation.

Some of the main challenges of wireless communications at mmW bands are increased propagation losses, even in line-of-sight (LOS), due to very short wavelength and absorption by various environmental effects. Very high diffraction losses that make non-line-of-sight (NLOS) difficult. The success of 5G technologies is closely related to seamless communications at mmW bands, which may be facilitated based on massive MIMO and/or network densification. For example, massive MIMO may create very high antenna gains (albeit, with much reduced beamwidth) to compensate for propagation losses. For network densification, base stations may be arranged more closely (e.g., small cells, indoor gNBs, etc.). Network densification involves various layers of components, such as gNBs, remote-radio-heads (RRH), various types of repeaters, small-cells, femto-cells, and reflecting surfaces. As noted above, IRSs may be characterized as RISs, or alternatively as meta-surfaces (e.g., surfaces made of so-called "meta-atoms"), and so on.

Figure 10:
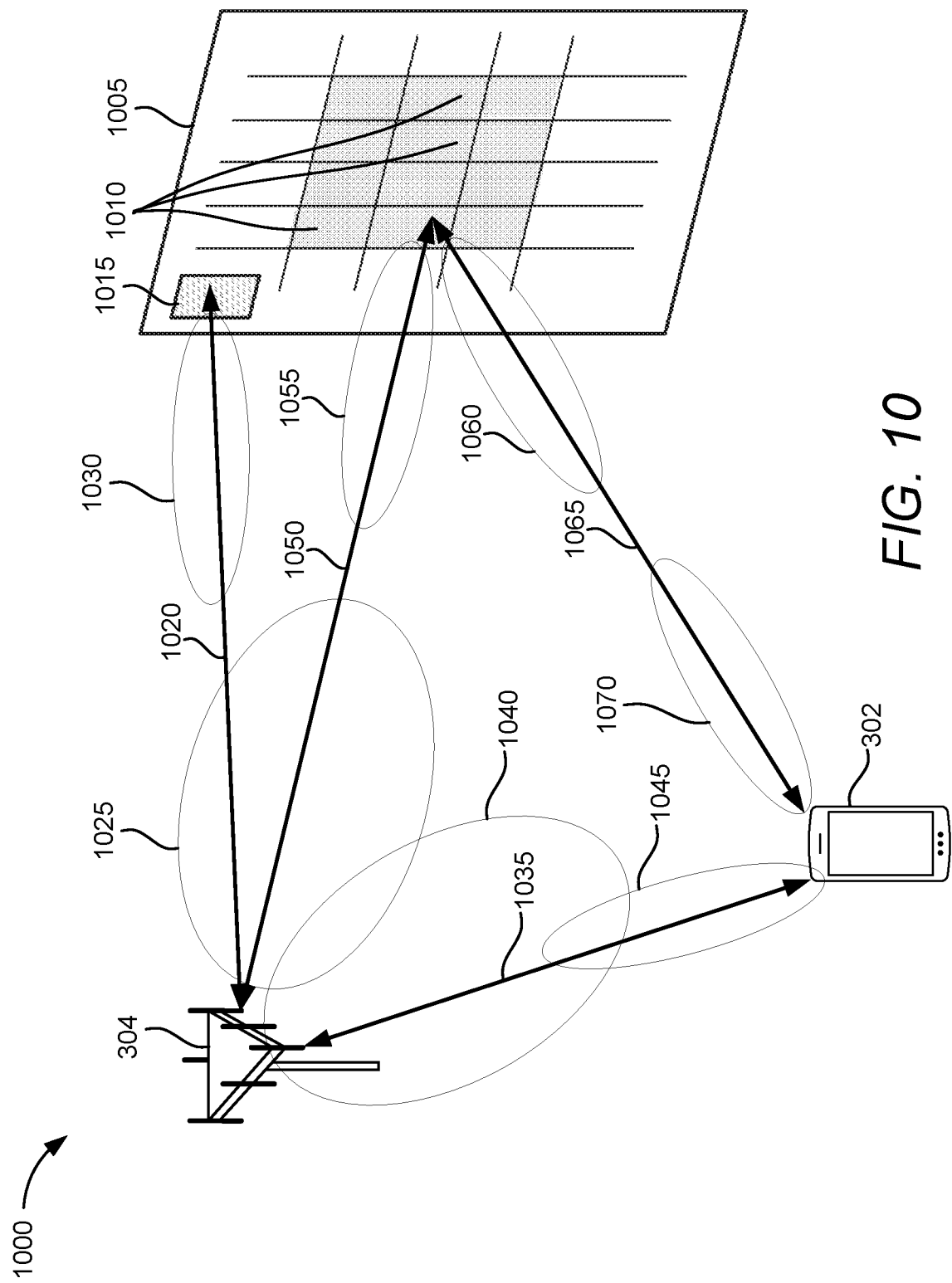
FIG. 10 illustrates a diagram of an example IRS architecture, according to aspects of the disclosure.

FIG. 10 illustrates a diagram of an example IRS architecture 1000, according to aspects of the disclosure. In FIG. 10, an IRS 1005 is depicted, along with BS 304 and UE 302. The IRS 1005 includes a reconfigurable surface with surface elements 1010 and a controller 1015.

Referring to FIG. 10, BS 304 may directly exchange control signals 1020 with the controller 1015 via gNB Tx/Rx beam 1025 and controller Tx/Rx beam 1030 (e.g., for adjusting the surface elements 1010, etc.). BS 304 may further directly exchange signals 1035 with UE 302 via gNB Tx/Rx beam 1040 and UE Tx/Rx beam 1045. In DL direction, BS 304 may transmit signals 1050 via gNB Tx/Rx beam 1025, which are received at IRS 1005 via IRS beam 1055 and are reflected off of respective surface element(s) 1010 of the IRS 1005 over an IRS beam 1060 as reflected signals 1065, which are received at UE 302 via UE Tx/Rx beam 1070. In UL direction, UE 302 may transmit signals 1065 via UE Tx/Rx beam 1070, which are received at IRS 1005 via IRS beam 1060 and are reflected off of respective surface element(s) 1010 of the IRS 1005 over IRS beam 1055 as reflected signals 1050, which are received at BS 304 via gNB Tx/Rx beam 1025.

Referring to FIG. 10, IRSs may generally be described as a surface with densely packed very small surface elements 1010. In some designs, each surface element 1010 has a controllable reflection coefficient, by which the phase-shift between the incident and reflected rays to/from the surface element can be controlled. Depending on implementation, various forms of non-ideal effects can happen (e.g., the phase-shift may have a limited range, or there may be a gain variation that depends on the phase-shift). Surface elements may also be referred to as meta-atoms depending on implementation.

By properly setting the surface phase (that is, the phases of surface elements 1010), gNB beam 1025 can be reflected from the IRS 1005 towards the UE 302 (in DL) or vice versa (in UL), as noted above. This may help to reduce pathloss and/or avoid blockages in the line-of-sight propagation. IRSs may be used in 3GPP 5G NR bands and mmW bands, IRSs may also be used with respect to other technologies, such as 4G LTE, 802.11 Wi-Fi, future generations, such as beyond 5G, and 6G, to other bands, such as sub-6 GHz, terahertz-bands, etc.

Referring to FIG. 10, in some designs, in terms of channel estimation, assume that there are M sub-areas. In this case, as is known in the art, a channel estimation algorithm may estimate M+1 channel coefficients (for a tone) for a direct path (from gNB to UE) and M reflected paths. This is accomplished by gNB transmitting M+1 RS symbols while in ith symbol, the phase of the jth sub-area is set based on the (j,i)th element of an orthonormal matrix (such as Hadamard matrix). Note that the direct path always corresponds to phase 0. Consequently, M+1 channel coefficients can be solved. Also, a UE not directly in a respective beam may measure a zero channel.

Figure 11:
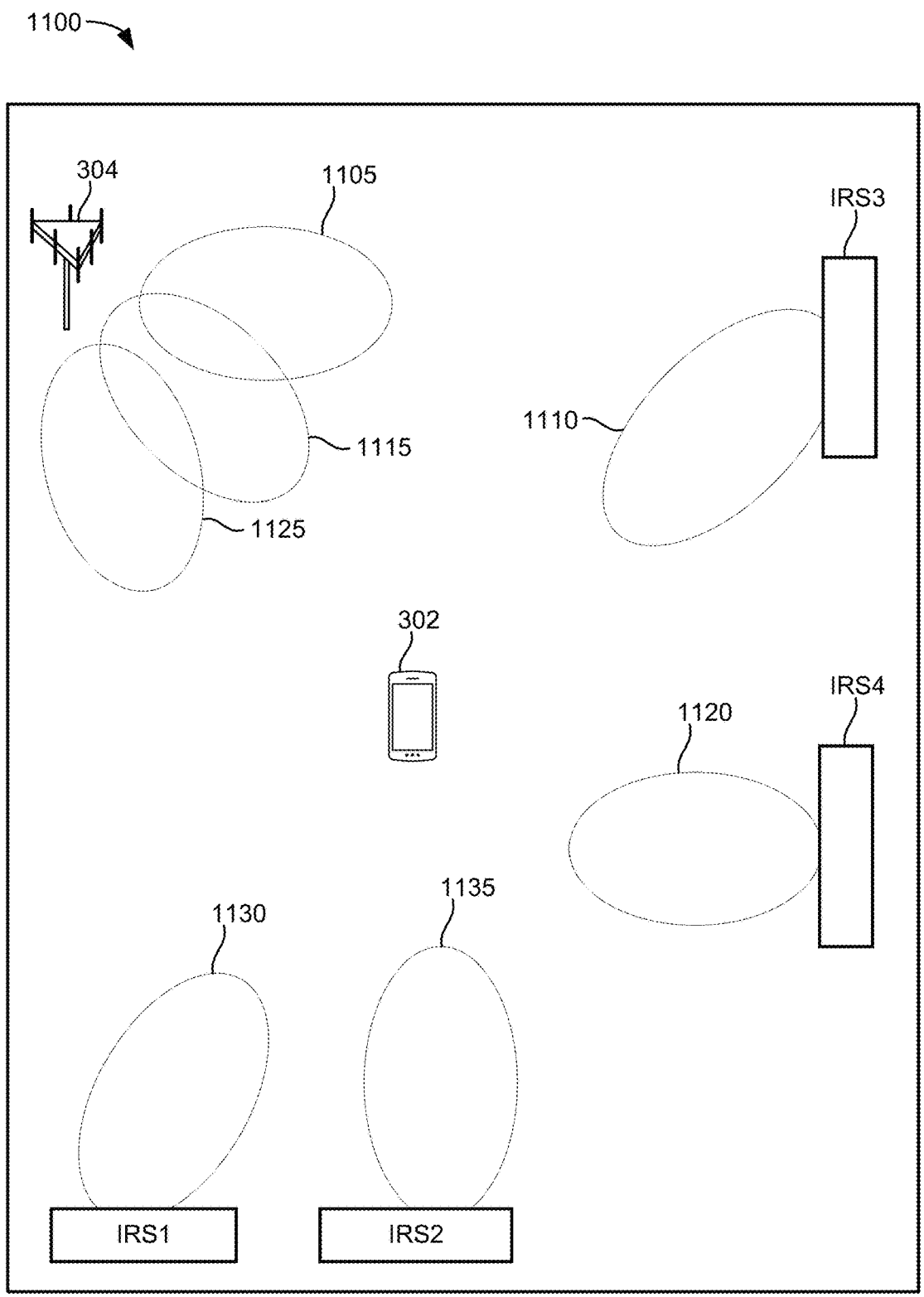
FIG. 11 illustrates an IRS-aided position estimation environment in accordance with aspects of the disclosure.

FIG. 11 illustrates an IRS-aided position estimation environment 1100 in accordance with aspects of the disclosure. In FIG. 11, the IRS-aided position estimation environment 1100 includes BS 304, UE 302, IRS1-IRS4. BS 304 aims gNB Tx beam 1105 towards IRS3, which forms a reflected beam 1110 aimed towards UE 302. BS 304 aims gNB Tx beam 1115 towards IRS4, which forms a reflected beam 1120 aimed towards UE 302. BS 304 aims gNB Tx beam 1125 towards IRS1 and IRS2, which form reflected beams 1130 and 1135 aimed towards UE 302. While not depicted expressly in FIG. 11, BS 304 may also have a beam aimed directly to UE 302 (not reflected off IRS) and beams may also be used in the reverse direction from UE 302 to BS 304.

Referring to FIG. 11, in some designs, BS 304 may for narrow or wide beams. Likewise, one or more of IRS1-IRS4 can be programmed to form narrow or wide beams. UE 302 may correspond to any UE type (smartphone, autonomous device, machinery on a factory floor, etc.). BS 304 may transmit reference signals (e.g., CSI-RS, SSB, etc.) which are reflected by one or more or IRS1-IRS4. In some designs, UE 302 may perform measurements (e.g., propagation delay such as RTT or TTDOA, AoA, etc.). In some designs, other information may also be available (e.g., gNB/IRS positions, beam directions, etc.). In some designs, a position estimate of UE 302 may be derived using algebraic manipulation of measurements and known data. In some designs, in order to provide a mechanism for UE 302 to distinguish received signals from gNBs/IRSs, phase-shifting techniques can be used (e.g., such as adding a pattern (in time-domain) of phase-shifts to the IRS surface phases (which need not cause the IRS beam to change).

In some designs, IRS-aided position estimation may be used for position estimation of UEs using fixed and known gNB and IRS locations. However, when a new IRS is installed (or when an existing IRS is moved or re-calibrated), the precise location of the IRS may need to be determined and made available to the gNB or the network (e.g., for that IRS to be used for focusing, positioning, and other applications).

In current systems, the position estimate and orientation may be configured manually (e.g., via a test or field device upon IRS installation). Aspects of the disclosure are directed to determination of a position estimate and an orientation (e.g., via rotation from a common orientation reference frame shared by various IRSs and/or UEs) of a target IRS (e.g., an IRS with an unknown or uncertain position estimate and orientation) based on multiple position estimates of UE(s) along with measurement information based on signal(s) reflected off of the target IRS. Such aspects may provide various technical advantages, such as simplifying the installation of IRSs, which may in turn be used to broaden coverage for IRS-aided communication and position estimation.

Figure 12:
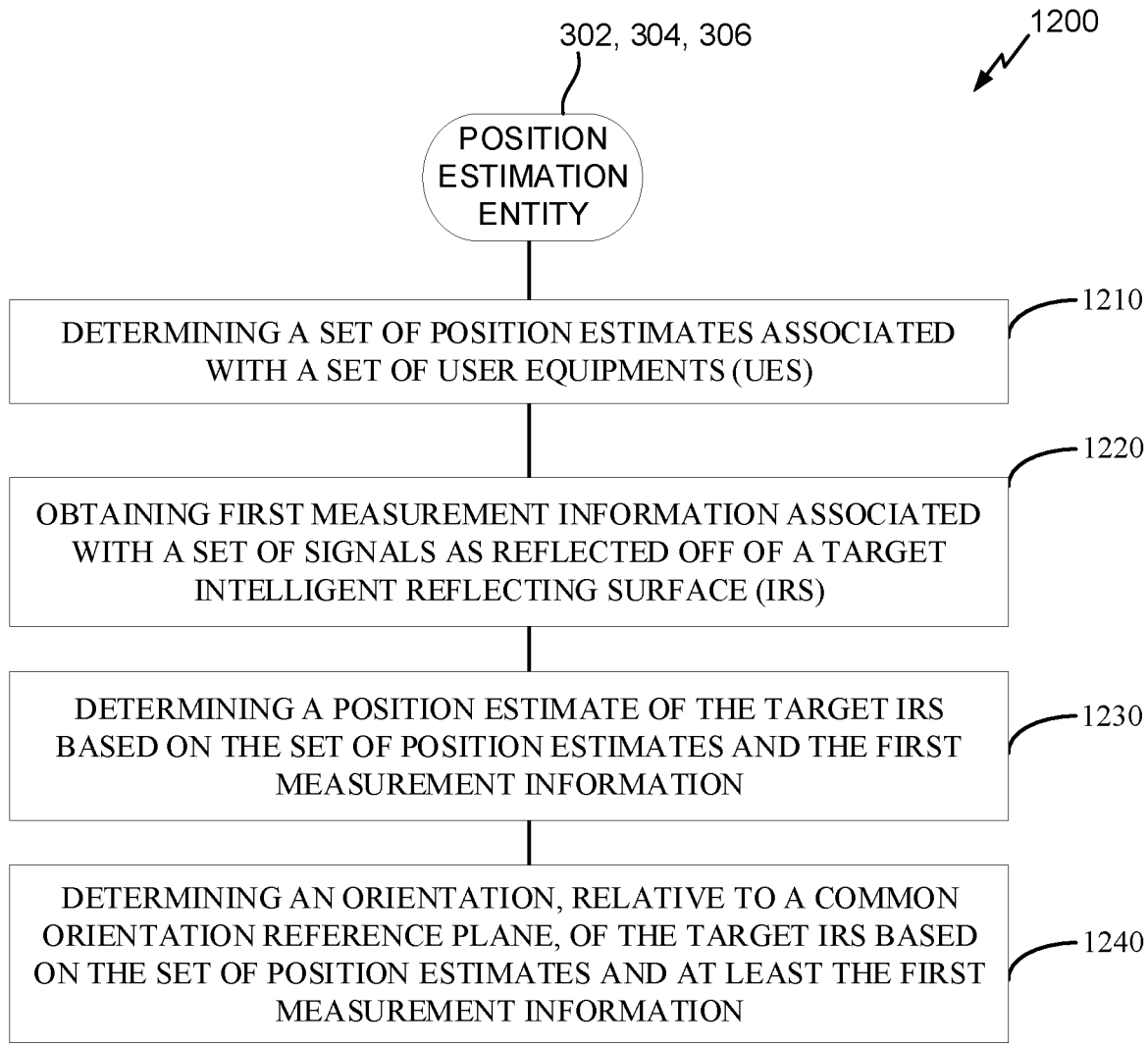
FIG. 12 illustrates an exemplary process of communication, according to aspects of the disclosure.

FIG. 12 illustrates an exemplary process 1200 of communication, according to aspects of the disclosure. In an aspect, the process 1200 may be performed by a position estimation entity, such as UE (e.g., for UE-based position estimation) or gNB (e.g., for LMF integrated in RAN) or a network entity 306 (e.g., a core network integrated LMF or other location server, etc.).

Referring to FIG. 12, at 1210, the position estimation entity (e.g., processor(s) 332 or 384 or 398, IRS component 342 or 388 or 398, etc.) determines a set of position estimates associated with a set of user equipments (UEs). As will be described below, the set of position estimates may be determined at 1210 in various ways (e.g., IRS-based position estimation, NR-based position estimation, satellite-based position estimation, etc.).

Referring to FIG. 12, at 1220, the position estimation entity (e.g., processor(s) 332 or 384 or 398, IRS component 342 or 388 or 398, receiver 312 or 322 or 352 or 362, network transceiver(s) 380 or 390, etc.) obtains first measurement information associated with a set of signals as reflected off of a target IRS. For example, the first measurement information may be reported to the position estimation entity by one or more UEs among the set of UEs, in some designs.

Referring to FIG. 12, at 1230, the position estimation entity (e.g., processor(s) 332 or 384 or 398, IRS component 342 or 388 or 398, etc.) determines a position estimate of the target IRS based on the set of position estimates and the first measurement information.

Referring to FIG. 12, at 1240, the position estimation entity (e.g., processor(s) 332 or 384 or 398, IRS component 342 or 388 or 398, etc.) determines an orientation, relative to a common orientation reference frame, of the target IRS based on the set of position estimates and at least the first measurement information.

Referring to FIG. 12, in some designs, the position estimation entity may further obtain second measurement information, as measured by the set of UEs, that is associated with the set of signals received by the set of UEs as reflected off of a set of IRSs with known locations and orientations relative to the common orientation reference frame. In some designs, the set of position estimates is determined based at least in part on a set of IRS-aided position estimation procedures using the second measurement information, or the set of position estimates is determined based at least in part on New Radio (NR) position estimation, or the set of position estimates is determined based at least in part on satellite position estimation (e.g., GNSS-based), or any combination thereof.

Referring to FIG. 12, in some designs, the set of position estimates is determined based at least in part on the second measurement information. In some designs, the set of position estimates is determined based at least in part upon a set of propagation delay measurements, as measured at the set of UEs, of the set of signals as reflected off of the set of IRSs. In some designs, the set of position estimates is determined based at least in part upon a set of angle of arrival (AoA) measurements, as measured at the set of UEs, of the set of signals as reflected off of the set of IRSs. In some designs, the position estimation entity may further determine a set of UE orientations, relative to the common orientation reference frame and associated with the set of position estimates, respectively, of the set of UEs, whereby the orientation of the target IRS is based on the set of position estimates, the set of AoA measurements, and the set of UE orientations. In some designs, for each UE orientation of the set of UE orientations, the UE orientation is determined via two or more rotations relative to two or more respective positions of two or more IRSs among the set of IRSs.

Figure 13:
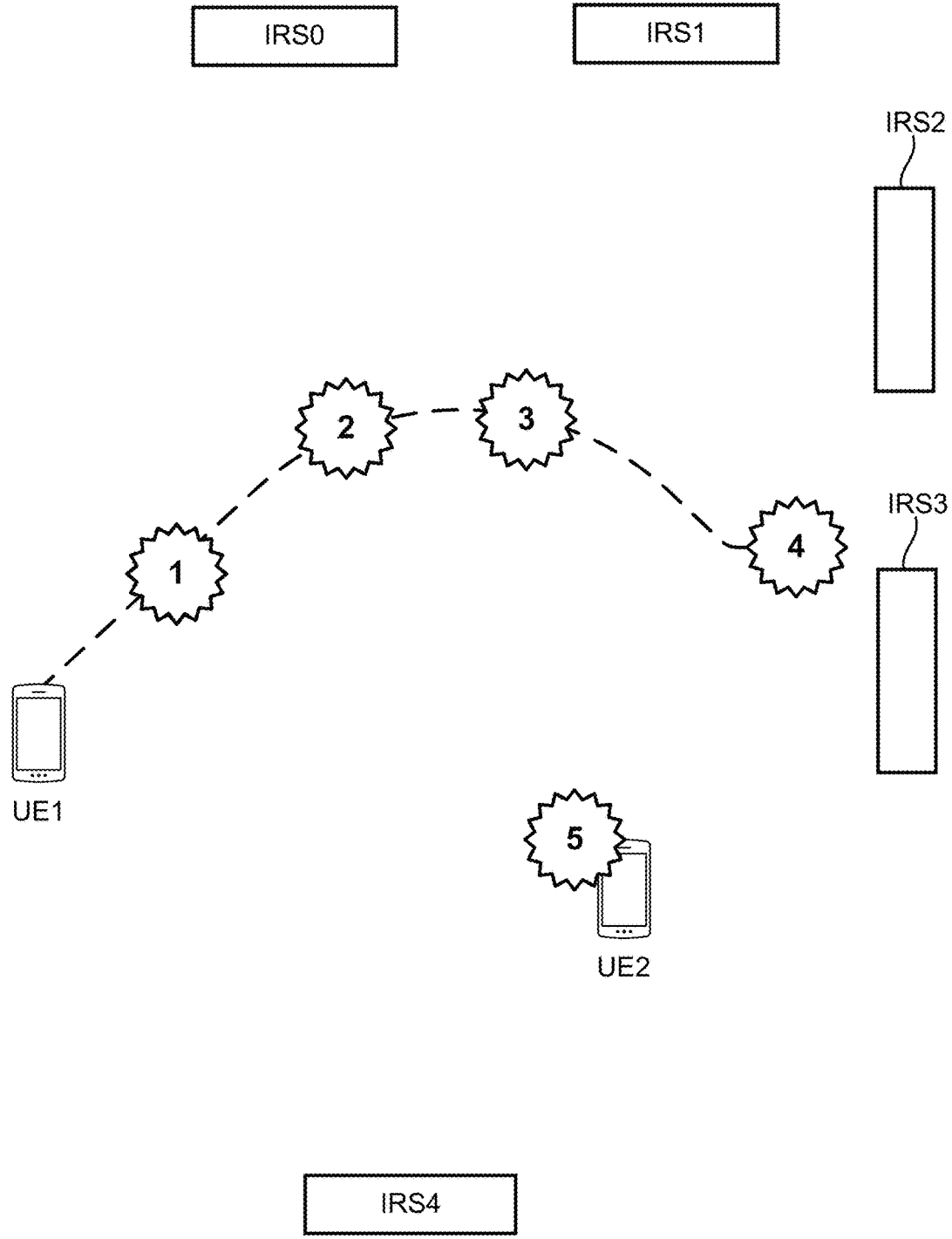
FIG. 13 illustrates an example implementation of the process of FIG. 12, according to aspects of the disclosure.

FIG. 13 illustrates an example implementation 1300 of the process of FIG. 12, according to aspects of the disclosure. In FIG. 13, IRS0-IRS3 (e.g., with known location/orientation), IRS4 (i.e., a target UE with unknown location/orientation), UE 1 and UE 2 are depicted. In FIG. 13, the set of position estimates includes five position estimates denoted as 1, 2, 3, 4 and 5. Position estimates 1-4 are associated with a moving UE (UE 1) and position estimate 5 is associated with a stationary UE (UE 5).

Referring to FIG. 13, in some designs, the IRS (i.e., IRS4) may be configured (or programmed) to form a wide beam or a sequence of narrower beams. In an example, IRS0-3 positions are known to gNB, and IRS4 position (and orientation) may need to be computed. In this example, UE1 takes four sets of measurements (e.g., measurements of reflections off of each of IRSs 0-4) as UE 1 moves around at respective locations 1, 2, 3 and 4. UE 2 is not moving, and takes a single set of measurement (e.g., measurements of reflections off of each of IRSs 0-4). The measurements for IRS0-3 are used to obtain the 5 UE positions. The UE positions and measurements for IRS4 are used to obtain position and orientation of IRS4 (e.g., using any propagation delay or AoA-based methods available).

Referring to FIG. 13, in some designs, in addition to the position of a newly installed IRS, its orientation may be detected so that it can be used for focusing, etc. In some designs, orientation measurement may be based on dividing the IRS surface into multiple sections (N sections), such as four quadrants (N=4), with each section programmed to form the same wide beam, or the same sequence of narrower beams. In some designs, the surface segmentation, can alternatively, vary over multiple symbols (such as a sequence of two halves (N=2) at a time, two vertical, followed by two horizontal, etc.), which may provide simpler position estimation and/or improved processing gain. In some designs, paths that are not reflected off of the IRS(s) may be removed so as to facilitate path separation. In some designs, position detection by several UEs (or, one or more moving UEs) of individual segments can be mapped to orientation information. In some designs, position detection for individual segments can be based on any existing position detection methods (such as based on propagation delay, AoA, etc.), such as UE measurements while gNB sends RS symbols (SSB, CSI-RS, DL PRS, etc.), or gNB measurements while UE sends SRS (or UL PRS), or via sidelink position estimation schemes.

Figure 14:
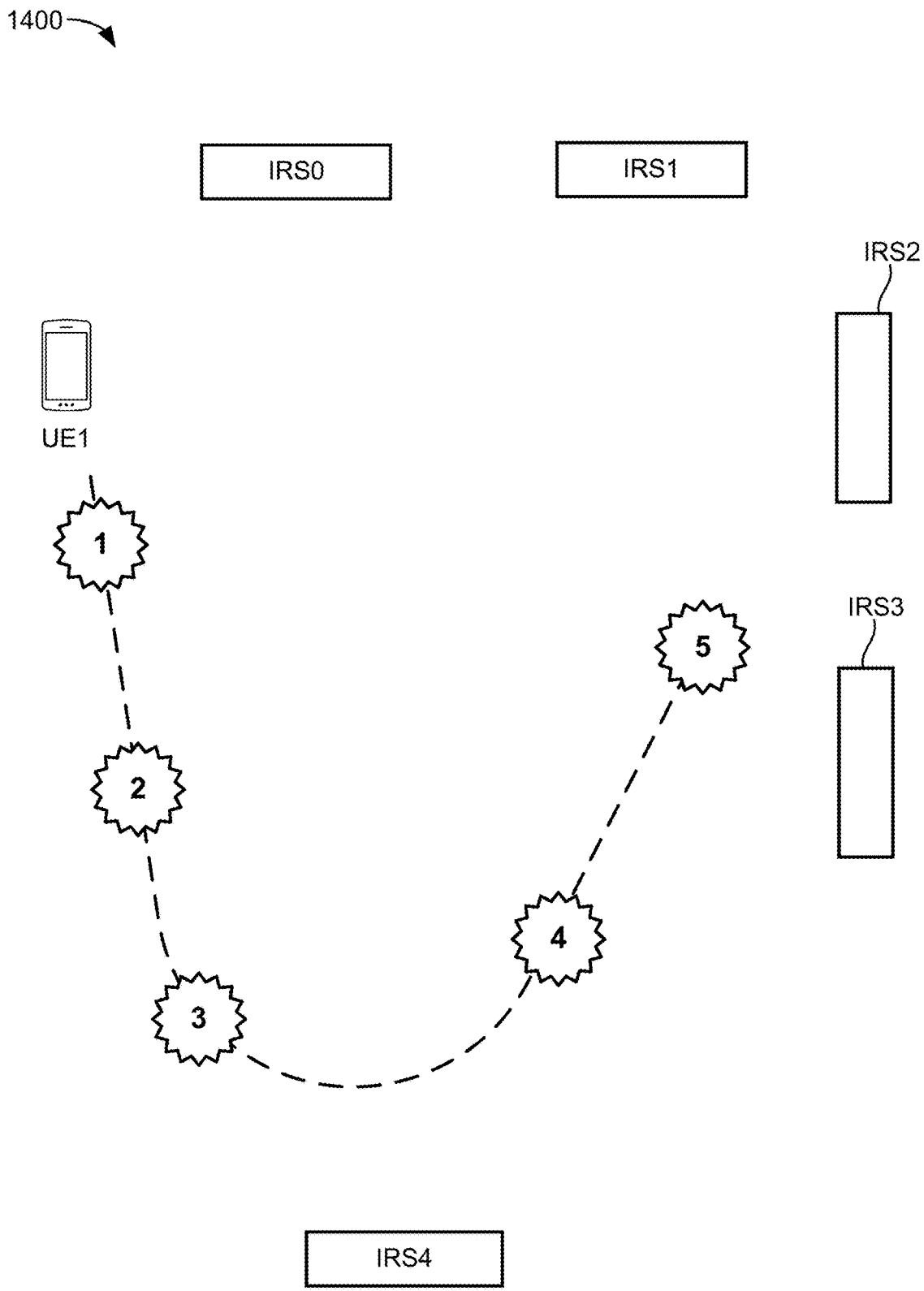
FIG. 14 illustrates an example implementation of the process of FIG. 12, according to aspects of the disclosure.

FIG. 14 illustrates an example implementation 1400 of the process of FIG. 12, according to aspects of the disclosure. In FIG. 14, IRS0-IRS3 (e.g., with known location/orientation), IRS4 (i.e., a target IRS with unknown location/orientation), and UE 1 are depicted. In FIG. 14, the set of position estimates includes five position estimates denoted as 1, 2, 3, 4 and 5. Position estimates 1-5 are each associated with a moving UE (UE 1). While not shown, in other designs, the set of position estimations could be associated with a group of stationary UEs (e.g., a moving UE is not expressly required). FIG. 14 is otherwise similar to FIG. 13 and will not be described further for the sake of brevity.

Referring to FIG. 12, in some designs, the set of UEs includes a single UE (e.g., as in FIG. 14). In this case, the set of position estimates may include multiple position estimates of the single UE at different locations and at different times. In other designs, the set of UEs may include at least a first UE and a second UE (e.g., as in FIG. 13). In this case, at least one of the first UE and the second UE is moving, and the set of position estimates may include multiple position estimates of the at least one moving UE at different locations and at different times. In some designs, at least one of the first UE and the second UE is stationary, and the set of position estimates may include a single position estimate of the at least one stationary UE.

Referring to FIG. 12, in some designs, the position estimation entity may configure the target IRS with N surface sections that are each configured to form a wide beam or a set of narrower beams of the set of signals as reflected off of the target IRS, and the wide beam, the set of narrower beams, or both, may be detectable at the set of UEs at respective locations associated with the set of position estimates.

Referring to FIG. 12, in some designs, the UE orientation(s) can be with respect to the common orientation reference frame can be deduced from the position and orientation information for the IRSs used in the positioning of the UE, in some designs, as will be described below in more detail.

Figure 15:
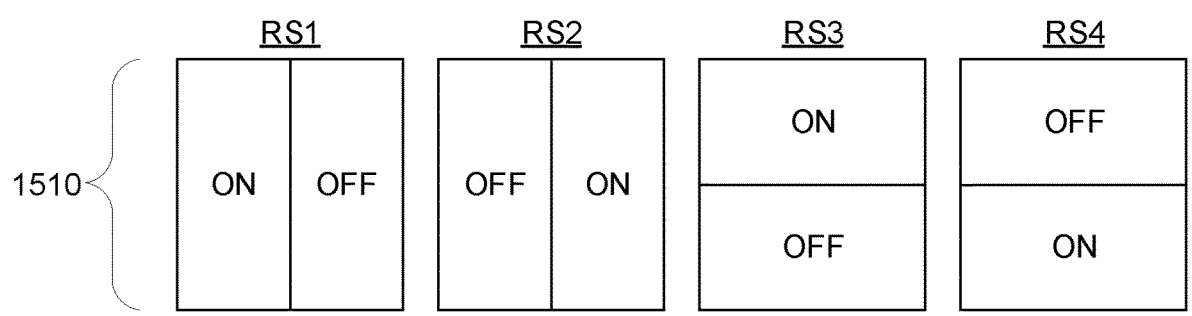
FIG. 15 illustrates IRS surface configurations for IRS orientation detection, in accordance with aspects of the disclosure.
Figure 15:
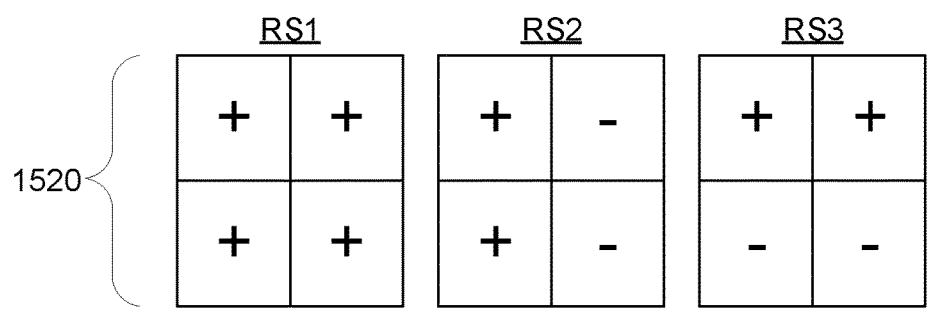

FIG. 15 illustrates IRS surface configurations 1500 for IRS orientation detection, in accordance with aspects of the disclosure. At 1510, ON/OFF-based IRS surface phase (4 reference signal (RS) Tx) are depicted. For example, the RS in this context may correspond to SSB or CSI-RS transmitted by the gNB and reflected off the IRS and received by the UE (or alternatively, the RS need not be DL-based but could be UL-based or SL-based relative to an anchor UE). In some designs, DL may be a preferred approach over UL as multiple UEs can simultaneously measure a DL signal. So, RS can be SRS transmitted by UE, reflected off IRS, and received by gNB. In an aspect, 1510 uses for example four CSI-RS symbols transmitted over time, and 1520 requires three symbols. At 1520, a Hadamard-based IRS surface phase (3 RS Tx) is depicted. With respect to FIG. 15, in an example, IRS orientation may be detected by segmenting the UE surface into at least three parts, as illustrated in FIG. 15. In some designs, three (or more) non-collinear points define orientation, since three non-collinear points in space define a plane, and hence its orientation. Segmentation can vary over time, as shown at 1510. In 1510, two RS symbols are transmitted and measured while the IRS surface is vertically segmented into two halves, and then two more RS symbols are transmitted and measured while the surface is segmented into two horizontal halves. The measurements can be used to estimate the center points of the four "ON" segments. This yields an estimate of the surface orientation as three or more non-collinear points on a plane are sufficient to determine the plane, and its orientation. Alternatively, the segmentation can be fixed over time with 180-degree phase offsets (+/−), as shown at 1520. The location of each segment is estimated by the same methods that were discussed for IRS position detection. In particular, the different segments may be distinguished via Hadamard based phase-shifting as shown at 1520 in some designs, or via ON/OFF based IRS surface phase as shown at 1510. For example, in 1520, RS1 plus RS2 gives a measurement that is equivalent to RS1 of 1510 (since the signal contribution from right-half will cancel). Similarly, in 1520, RS1 minus RS2 yields a measurement similar to RS2 of 1510 as the signal from left-half will cancel, etc.

Referring to FIG. 15, in some designs, if IRS orientation detection is accurate enough, the IRS orientation detection can also be used for position detection (e.g., by averaging the locations of the segments, or by skipping the IRS-aided position estimation). In some designs, to obtain the position of any segment, after separated impulse responses are formed, a propagation delay or AoA-based position estimation may be used.

Referring to FIG. 12, in some designs, position/orientation estimation of an IRS may be based on propagation delay and/or angle of arrival (AoA) measurements taken from a number of UEs (or UE locations). When AoA is used, the UE(s)' position and orientation may need to be known as well. Orientation of a UE may be defined as the orientation of the UE's frame of reference with respect to the common frame of reference.

For example, UE's frame of reference could be {x=right edge of phone, y=top edge of phone, z=front side of phone} and the common frame of reference could be based on a terrestrial coordinate system or may be defined by the room in which all objects of interest are located.

Generally, the UE orientation may be determined with knowledge of, e.g.:

Position of the UE with respect to a common reference frame, denoted as $p_{UE}$, Positions of at least two IRSs with respect to a common reference frame, denoted as $p_{IRS1}$ and $p_{IRS2}$, and Angles of arrival from those IRSs as measured in UE's reference frame, represented by unit vectors $u_{aoa1}$, $u_{aoa2}$, in UE's reference frame.

Mathematically, the problem can be restated as follows:

Let $\{p_1, p_2\}$ be unit vectors in the directions of the two IRSs whose positions are known with respect to common reference frame:

$p_1 = (p_{IRS1} - p_{UE})/|p_{IRS1} - p_{UE}|$ and $p_2 = (p_{IRS2} - p_{UE})/|p_{IRS2} - p_{UE}|$.

Then, then the orientation of the UE can be described by an orthonormal matrix R that transforms $\{u_{aua1}, u_{aoa2}\}$ to $\{p_1, p_2\}$, respectively, that is R such that: $p_1 = R u_{aoa1}$ and $p_2 = R u_{aoa2}$.

Note that if only a single AoA was provided, say $\{u_{aoa1}, p_1\}$, the orientation could only be determined up to a rotation around $p_1$. Providing a second vectors to match, that is $\{u_{aoa2}, p_2\}$, fixes that remaining ambiguity.

Mathematical formulae such as Euler's Angles, Euler's Rotation Theorem, etc. may be used for the various mathematical algorithms, as is known in the art.

In some designs, the R matrix can be computed in two stages. First, find the matrix $R_1$ that rotates $u_{aoa1}$ to $p_1$. Then, find the matrix $R_2$ that rotates $R_1 u_{aoa2}$ to $p_2$ (by a rotation around $p_1$). The final "UE orientation" matrix R may be given by $R = R_2 R_1$.

$R_1$ simply is the rotation matrix corresponding to a rotation axis that is perpendicular to both $p_1$ and $u_{aoa1}$, and an angle of $acos(<p_1, u_{aoa1}>)$. The rotation axis, therefore, can be obtained as $r_1 = (u_{aoa1} \times p_1)/|u_{aoa1} \times p_1|$, where "x" denotes the cross-product. In the above, $<.,.>$ denotes the inner product and $acos(.)$ is the inverse cosine function.

To compute R2, first define:

$q_1 = R_1 u_{aoa2} - <R_1 U_{aoa2}, p_1> p_1/|R_1 u_{aoa2} - <R_1 u_{aoa2}, p_1 > p_1|$, and $q_2 = p_2 - <p_2, p_1> p_1/|p_2 - <p_2, p_1> p_1|$.

Then, $R_2$ is a rotation matrix corresponding to a rotation axis, $r_2$, that is perpendicular to $q_1$ and $q_2$ (that is, $r_2 = (q_1 \times q_2)/|q_1 \times q_2|$), and an angle $acos(<q_1, q_2>)$.

Referring to FIG. 12, in some designs, a minimum number of UE measurements may be needed to compute IRS position/orientation. In some designs, when using propagation delay only, measurements at 3 (or more) UE positions may be needed. In some designs, when using AoA only, measurements at 2 (or more) UE positions may be needed. In some designs, when using propagation delay and AoA, measurements at 1 (or more) UE position may be needed (e.g., 1 measurement of delay and 1 measurement of AoA needed from the same UE location). The above examples of minimum UE measurements assume knowledge of UE position together with propagation delay measurements (e.g., for IRS-aided position estimation, 3 IRSs may be required with known positions to obtain this information), and/or knowledge of UE position and orientation with propagation delay and AoA measurements (e.g., for IRS-aided position estimation, 3 IRSs may be required with known positions to obtain this information).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a position estimation entity, comprising: determining a set of position estimates associated with a set of user equipments (UEs); obtaining first measurement information associated with a set of signals as reflected off of a target intelligent reflecting surface (IRS); determining a position estimate of the target IRS based on the set of position estimates and the first measurement information; and determining an orientation, relative to a common orientation reference frame, of the target IRS based on the set of position estimates and at least the first measurement information.

Clause 2. The method of clause 1, further comprising: obtaining second measurement information, as measured by the set of UEs, that is associated with the set of signals received by the set of UEs as reflected off of a set of IRSs with known locations and orientations relative to the common orientation reference frame.

Clause 3. The method of clause 2, wherein the set of position estimates is determined based at least in part on a set of IRS-aided position estimation procedures using the second measurement information, or wherein the set of position estimates is determined based at least in part on New Radio (NR) position estimation, or wherein the set of position estimates is determined based at least in part on satellite position estimation, or any combination thereof.

Clause 4. The method of any of clauses 2 to 3, wherein the set of position estimates is determined based at least in part on the second measurement information.

Clause 5. The method of clause 4, wherein the set of position estimates is determined based at least in part upon a set of propagation delay measurements, as measured at the set of UEs, of the set of signals as reflected off of the set of IRSs, or wherein the set of position estimates is determined based at least in part upon a set of angle of arrival (AoA) measurements, as measured at the set of UEs, of the set of signals as reflected off of the set of IRSs, or a combination thereof Clause 6. The method of clause 5, further comprising: determining a set of UE orientations, relative to the common orientation reference frame and associated with the set of position estimates, respectively, of the set of UEs.

Clause 7. The method of clause 6, wherein for each UE orientation of the set of UE orientations, the UE orientation is determined via two or more rotations relative to two or more respective positions of two or more IRSs among the set of IRSs.

Clause 8. The method of any of clauses 6 to 7, wherein the position estimate and the orientation of the target IRS are based on the set of position estimates, the set of propagation delay measurements and the set of AoA measurements, the set of UE orientations, or any combination thereof.

Clause 9. The method of any of clauses 1 to 8, wherein the set of UEs comprises a single UE.

Clause 10. The method of clause 9, wherein the set of position estimates comprises multiple position estimates of the single UE at different locations and at different times.

Clause 11. The method of any of clauses 1 to 10, wherein the set of UEs comprises at least a first UE and a second UE.

Clause 12. The method of clause 11, wherein at least one of the first UE and the second UE is moving, and wherein the set of position estimates comprises multiple position estimates of the at least one moving UE at different locations and at different times.

Clause 13. The method of any of clauses 11 to 12, wherein at least one of the first UE and the second UE is stationary, and wherein the set of position estimates comprises a single position estimate of the at least one stationary UE.

Clause 14. The method of any of clauses 1 to 13, configuring the target IRS with N surface sections that are each configured to form a wide beam or a set of narrower beams of the set of signals as reflected off of the target IRS, and wherein the wide beam, the set of narrower beams, or both, are detectable at the set of UEs at respective locations associated with the set of position estimates.

Clause 15. The method of clause 14, further comprising: determining positions of three or more non-collinear points corresponding to positions of three or more of the surface sections on the target IRS; and determining an IRS surface orientation of the target IRS based in part on the determined positions.

Clause 16. The method of clause 15, wherein the determination of the IRS surface orientation is based on an IRS surface configuration that comprises an ON region and an OFF region, wherein the N surface sections corresponds to the ON region.

Clause 17. The method of any of clauses 15 to 16, wherein the N surface sections comprise a first set of surface sections associated with a first phase shift, and wherein the N surface sections comprise a second set of surface sections associated with a second phase shift that is offset from the first phase shift by 180 degrees.

Clause 18. The method of any of clauses 1 to 17, wherein the set of signals is transmitted by the set of UEs, with the first measurement information being based on measurements, by a base station or an anchor UE, of the set of signals as reflected off of the target IRS, or wherein the set of signals is transmitted by the base station or the anchor UE, with the first measurement information being based on measurements, by the set of UEs, of the set of signals as reflected off of the target IRS.

Clause 19. A position estimation entity, comprising: a memory; at least one transceiver; and at least one processor communicatively coupled to the memory and the at least one transceiver, the at least one processor configured to: determine a set of position estimates associated with a set of user equipments (UEs); obtain first measurement information associated with a set of signals as reflected off of a target intelligent reflecting surface (IRS); determine a position estimate of the target IRS based on the set of position estimates and the first measurement information; and determine an orientation, relative to a common orientation reference frame, of the target IRS based on the set of position estimates and at least the first measurement information.

Clause 20. The position estimation entity of clause 19, wherein the at least one processor is further configured to: obtain second measurement information, as measured by the set of UEs, that is associated with the set of signals received by the set of UEs as reflected off of a set of IRSs with known locations and orientations relative to the common orientation reference frame.

Clause 21. The position estimation entity of clause 20, wherein the set of position estimates is determined based at least in part on a set of IRS-aided position estimation procedures using the second measurement information, or wherein the set of position estimates is determined based at least in part on New Radio (NR) position estimation, or wherein the set of position estimates is determined based at least in part on satellite position estimation, or any combination thereof Clause 22. The position estimation entity of any of clauses 20 to 21, wherein the set of position estimates is determined based at least in part on the second measurement information.

Clause 23. The position estimation entity of clause 22, wherein the set of position estimates is determined based at least in part upon a set of propagation delay measurements, as measured at the set of UEs, of the set of signals as reflected off of the set of IRSs, or wherein the set of position estimates is determined based at least in part upon a set of angle of arrival (AoA) measurements, as measured at the set of UEs, of the set of signals as reflected off of the set of IRSs, or a combination thereof Clause 24. The position estimation entity of clause 23, wherein the at least one processor is further configured to: determine a set of UE orientations, relative to the common orientation reference frame and associated with the set of position estimates, respectively, of the set of UEs.

Clause 25. The position estimation entity of clause 24, wherein for each UE orientation of the set of UE orientations, the UE orientation is determined via two or more rotations relative to two or more respective positions of two or more IRSs among the set of IRSs.

Clause 26. The position estimation entity of any of clauses 24 to 25, wherein the position estimate and the orientation of the target IRS are based on the set of position estimates, the set of propagation delay measurements and the set of AoA measurements, the set of UE orientations, or any combination thereof.

Clause 27. The position estimation entity of any of clauses 19 to 26, wherein the set of UEs comprises a single UE.

Clause 28. The position estimation entity of clause 27, wherein the set of position estimates comprises multiple position estimates of the single UE at different locations and at different times.

Clause 29. The position estimation entity of any of clauses 19 to 28, wherein the set of UEs comprises at least a first UE and a second UE.

Clause 30. The position estimation entity of clause 29, wherein at least one of the first UE and the second UE is moving, and wherein the set of position estimates comprises multiple position estimates of the at least one moving UE at different locations and at different times.

Clause 31. The position estimation entity of any of clauses 29 to 30, wherein at least one of the first UE and the second UE is stationary, and wherein the set of position estimates comprises a single position estimate of the at least one stationary UE.

Clause 32. The position estimation entity of any of clauses 19 to 31, wherein the at least one processor is further configured to: configure the target IRS with N surface sections that are each configured to form a wide beam or a set of narrower beams of the set of signals as reflected off of the target IRS, and wherein the wide beam, the set of narrower beams, or both, are detectable at the set of UEs at respective locations associated with the set of position estimates.

Clause 33. The position estimation entity of clause 32, wherein the at least one processor is further configured to: determine positions of three or more non-collinear points corresponding to positions of three or more of the surface sections on the target IRS; and determine an IRS surface orientation of the target IRS based in part on the determined positions.

Clause 34. The position estimation entity of clause 33, wherein the determination of the IRS surface orientation is based on an IRS surface configuration that comprises an ON region and an OFF region, wherein the N surface sections corresponds to the ON region.

Clause 35. The position estimation entity of any of clauses 33 to 34, wherein the N surface sections comprise a first set of surface sections associated with a first phase shift, and wherein the N surface sections comprise a second set of surface sections associated with a second phase shift that is offset from the first phase shift by 180 degrees.

Clause 36. The position estimation entity of any of clauses 19 to 35, wherein the set of signals is transmitted by the set of UEs, with the first measurement information being based on measurements, by a base station or an anchor UE, of the set of signals as reflected off of the target IRS, or wherein the set of signals is transmitted by the base station or the anchor UE, with the first measurement information being based on measurements, by the set of UEs, of the set of signals as reflected off of the target IRS.

Clause 37. A position estimation entity, comprising: means for determining a set of position estimates associated with a set of user equipments (UEs); means for obtaining first measurement information associated with a set of signals as reflected off of a target intelligent reflecting surface (IRS); means for determining a position estimate of the target IRS based on the set of position estimates and the first measurement information; and means for determining an orientation, relative to a common orientation reference frame, of the target IRS based on the set of position estimates and at least the first measurement information.

Clause 38. The position estimation entity of clause 37, further comprising: means for obtaining second measurement information, as measured by the set of UEs, that is associated with the set of signals received by the set of UEs as reflected off of a set of IRSs with known locations and orientations relative to the common orientation reference frame.

Clause 39. The position estimation entity of clause 38, wherein the set of position estimates is determined based at least in part on a set of IRS-aided position estimation procedures using the second measurement information, or wherein the set of position estimates is determined based at least in part on New Radio (NR) position estimation, or wherein the set of position estimates is determined based at least in part on satellite position estimation, or any combination thereof Clause 40. The position estimation entity of any of clauses 38 to 39, wherein the set of position estimates is determined based at least in part on the second measurement information.

Clause 41. The position estimation entity of clause 40, wherein the set of position estimates is determined based at least in part upon a set of propagation delay measurements, as measured at the set of UEs, of the set of signals as reflected off of the set of IRSs, or wherein the set of position estimates is determined based at least in part upon a set of angle of arrival (AoA) measurements, as measured at the set of UEs, of the set of signals as reflected off of the set of IRSs, or a combination thereof Clause 42. The position estimation entity of clause 41, further comprising: means for determining a set of UE orientations, relative to the common orientation reference frame and associated with the set of position estimates, respectively, of the set of UEs.

Clause 43. The position estimation entity of clause 42, wherein for each UE orientation of the set of UE orientations, the UE orientation is determined via two or more rotations relative to two or more respective positions of two or more IRSs among the set of IRSs.

Clause 44. The position estimation entity of any of clauses 42 to 43, wherein the position estimate and the orientation of the target IRS are based on the set of position estimates, the set of propagation delay measurements and the set of AoA measurements, the set of UE orientations, or any combination thereof.

Clause 45. The position estimation entity of any of clauses 37 to 44, wherein the set of UEs comprises a single UE.

Clause 46. The position estimation entity of clause 45, wherein the set of position estimates comprises multiple position estimates of the single UE at different locations and at different times.

Clause 47. The position estimation entity of any of clauses 37 to 46, wherein the set of UEs comprises at least a first UE and a second UE.

Clause 48. The position estimation entity of clause 47, wherein at least one of the first UE and the second UE is moving, and wherein the set of position estimates comprises multiple position estimates of the at least one moving UE at different locations and at different times.

Clause 49. The position estimation entity of any of clauses 47 to 48, wherein at least one of the first UE and the second UE is stationary, and wherein the set of position estimates comprises a single position estimate of the at least one stationary UE.

Clause 50. The position estimation entity of any of clauses 37 to 49, means for configuring the target IRS with N surface sections that are each configured to form a wide beam or a set of narrower beams of the set of signals as reflected off of the target IRS, and wherein the wide beam, the set of narrower beams, or both, are detectable at the set of UEs at respective locations associated with the set of position estimates.

Clause 51. The position estimation entity of clause 50, further comprising: means for determining positions of three or more non-collinear points corresponding to positions of three or more of the surface sections on the target IRS; and means for determining an IRS surface orientation of the target IRS based in part on the determined positions.

Clause 52. The position estimation entity of clause 51, wherein the determination of the IRS surface orientation is based on an IRS surface configuration that comprises an ON region and an OFF region, wherein the N surface sections corresponds to the ON region.

Clause 53. The position estimation entity of any of clauses 51 to 52, wherein the N surface sections comprise a first set of surface sections associated with a first phase shift, and wherein the N surface sections comprise a second set of surface sections associated with a second phase shift that is offset from the first phase shift by 180 degrees.

Clause 54. The position estimation entity of any of clauses 37 to 53, wherein the set of signals is transmitted by the set of UEs, with the first measurement information being based on measurements, by a base station or an anchor UE, of the set of signals as reflected off of the target IRS, or wherein the set of signals is transmitted by the base station or the anchor UE, with the first measurement information being based on measurements, by the set of UEs, of the set of signals as reflected off of the target IRS.

Clause 55. A non-transitory computer-readable medium storing computer-executable instructions that, when executed by a position estimation entity, cause the position estimation entity to: determine a set of position estimates associated with a set of user equipments (UEs); obtain first measurement information associated with a set of signals as reflected off of a target intelligent reflecting surface (IRS); determine a position estimate of the target IRS based on the set of position estimates and the first measurement information; and determine an orientation, relative to a common orientation reference frame, of the target IRS based on the set of position estimates and at least the first measurement information.

Clause 56. The non-transitory computer-readable medium of clause 55, further comprising computer-executable instructions that, when executed by the position estimation entity, cause the position estimation entity to: obtain second measurement information, as measured by the set of UEs, that is associated with the set of signals received by the set of UEs as reflected off of a set of IRSs with known locations and orientations relative to the common orientation reference frame.

Clause 57. The non-transitory computer-readable medium of clause 56, wherein the set of position estimates is determined based at least in part on a set of IRS-aided position estimation procedures using the second measurement information, or wherein the set of position estimates is determined based at least in part on New Radio (NR) position estimation, or wherein the set of position estimates is determined based at least in part on satellite position estimation, or any combination thereof.

Clause 58. The non-transitory computer-readable medium of any of clauses 56 to 57, wherein the set of position estimates is determined based at least in part on the second measurement information.

Clause 59. The non-transitory computer-readable medium of clause 58, wherein the set of position estimates is determined based at least in part upon a set of propagation delay measurements, as measured at the set of UEs, of the set of signals as reflected off of the set of IRSs, or wherein the set of position estimates is determined based at least in part upon a set of angle of arrival (AoA) measurements, as measured at the set of UEs, of the set of signals as reflected off of the set of IRSs, or a combination thereof Clause 60. The non-transitory computer-readable medium of clause 59, further comprising computer-executable instructions that, when executed by the position estimation entity, cause the position estimation entity to: determine a set of UE orientations, relative to the common orientation reference frame and associated with the set of position estimates, respectively, of the set of UEs.

Clause 61. The non-transitory computer-readable medium of clause 60, wherein for each UE orientation of the set of UE orientations, the UE orientation is determined via two or more rotations relative to two or more respective positions of two or more IRSs among the set of IRSs.

Clause 62. The non-transitory computer-readable medium of any of clauses 60 to 61, wherein the position estimate and the orientation of the target IRS are based on the set of position estimates, the set of propagation delay measurements and the set of AoA measurements, the set of UE orientations, or any combination thereof.

Clause 63. The non-transitory computer-readable medium of any of clauses 55 to 62, wherein the set of UEs comprises a single UE.

Clause 64. The non-transitory computer-readable medium of clause 63, wherein the set of position estimates comprises multiple position estimates of the single UE at different locations and at different times.

Clause 65. The non-transitory computer-readable medium of any of clauses 55 to 64, wherein the set of UEs comprises at least a first UE and a second UE.

Clause 66. The non-transitory computer-readable medium of clause 65, wherein at least one of the first UE and the second UE is moving, and wherein the set of position estimates comprises multiple position estimates of the at least one moving UE at different locations and at different times.

Clause 67. The non-transitory computer-readable medium of any of clauses 65 to 66, wherein at least one of the first UE and the second UE is stationary, and wherein the set of position estimates comprises a single position estimate of the at least one stationary UE.

Clause 68. The non-transitory computer-readable medium of any of clauses 55 to 67, further comprising computer-executable instructions that, when executed by the position estimation entity, cause the position estimation entity to: configure the target IRS with N surface sections that are each configured to form a wide beam or a set of narrower beams of the set of signals as reflected off of the target IRS, and wherein the wide beam, the set of narrower beams, or both, are detectable at the set of UEs at respective locations associated with the set of position estimates.

Clause 69. The non-transitory computer-readable medium of clause 68, further comprising computer-executable instructions that, when executed by the position estimation entity, cause the position estimation entity to: determine positions of three or more non-collinear points corresponding to positions of three or more of the surface sections on the target IRS; and determine an IRS surface orientation of the target IRS based in part on the determined positions.

Clause 70. The non-transitory computer-readable medium of clause 69, wherein the determination of the IRS surface orientation is based on an IRS surface configuration that comprises an ON region and an OFF region, wherein the N surface sections corresponds to the ON region.

Clause 71. The non-transitory computer-readable medium of any of clauses 69 to 70, wherein the N surface sections comprise a first set of surface sections associated with a first phase shift, and wherein the N surface sections comprise a second set of surface sections associated with a second phase shift that is offset from the first phase shift by 180 degrees.

Clause 72. The non-transitory computer-readable medium of any of clauses 55 to 71, wherein the set of signals is transmitted by the set of UEs, with the first measurement information being based on measurements, by a base station or an anchor UE, of the set of signals as reflected off of the target IRS, or wherein the set of signals is transmitted by the base station or the anchor UE, with the first measurement information being based on measurements, by the set of UEs, of the set of signals as reflected off of the target IRS.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a position estimation entity, comprising:
   determining a set of position estimates associated with a set of user equipments (UEs);
   obtaining first measurement information associated with a set of signals as reflected off of a target intelligent reflecting surface (IRS);
   determining a position estimate of the target IRS based on the set of position estimates and the first measurement information; and
   determining an orientation, relative to a common orientation reference frame, of the target IRS based on the set of position estimates and at least the first measurement information.

2. The method of claim 1, further comprising:
   obtaining second measurement information, as measured by the set of UEs, that is associated with the set of signals received by the set of UEs as reflected off of a set of IRSs with known locations and orientations relative to the common orientation reference frame.

3. The method of claim 2,
   wherein the set of position estimates is determined based at least in part on a set of IRS-aided position estimation procedures using the second measurement information, or
   wherein the set of position estimates is determined based at least in part on New Radio (NR) position estimation, or
   wherein the set of position estimates is determined based at least in part on satellite position estimation, or
   any combination thereof.

4. The method of claim 2, wherein the set of position estimates is determined based at least in part on the second measurement information.

5. The method of claim 4,
   wherein the set of position estimates is determined based at least in part upon a set of propagation delay measurements, as measured at the set of UEs, of the set of signals as reflected off of the set of IRSs, or
   wherein the set of position estimates is determined based at least in part upon a set of angle of arrival (AoA) measurements, as measured at the set of UEs, of the set of signals as reflected off of the set of IRSs, or
   a combination thereof.

6. The method of claim 5, further comprising:
   determining a set of UE orientations, relative to the common orientation reference frame and associated with the set of position estimates, respectively, of the set of UEs.

7. The method of claim 6, wherein for each UE orientation of the set of UE orientations, the UE orientation is determined via two or more rotations relative to two or more respective positions of two or more IRSs among the set of IRSs.

8. The method of claim 6, wherein the position estimate and the orientation of the target IRS are based on the set of position estimates, the set of propagation delay measurements and the set of AoA measurements, the set of UE orientations, or any combination thereof.

9. The method of claim 1, wherein the set of UEs comprises a single UE.

10. The method of claim 9, wherein the set of position estimates comprises multiple position estimates of the single UE at different locations and at different times.

11. The method of claim 1, wherein the set of UEs comprises at least a first UE and a second UE.

12. The method of claim 11,
    wherein at least one of the first UE and the second UE is moving, and
    wherein the set of position estimates comprises multiple position estimates of the at least one moving UE at different locations and at different times.

13. The method of claim 11,
    wherein at least one of the first UE and the second UE is stationary, and
    wherein the set of position estimates comprises a single position estimate of the at least one stationary UE.

14. The method of claim 1,
    configuring the target IRS with N surface sections that are each configured to form a wide beam or a set of narrower beams of the set of signals as reflected off of the target IRS, and
    wherein the wide beam, the set of narrower beams, or both, are detectable at the set of UEs at respective locations associated with the set of position estimates.

15. The method of claim 14, further comprising:
    determining positions of three or more non-collinear points corresponding to positions of three or more of the surface sections on the target IRS; and
    determining an IRS surface orientation of the target IRS based in part on the determined positions.

16. The method of claim 15,
    wherein the determination of the IRS surface orientation is based on an IRS surface configuration that comprises an ON region and an OFF region,
    wherein the N surface sections corresponds to the ON region.

17. The method of claim 15,
    wherein the N surface sections comprise a first set of surface sections associated with a first phase shift, and
    wherein the N surface sections comprise a second set of surface sections associated with a second phase shift that is offset from the first phase shift by 180 degrees.

18. The method of claim 1,
    wherein the set of signals is transmitted by the set of UEs, with the first measurement information being based on measurements, by a base station or an anchor UE, of the set of signals as reflected off of the target IRS, or
    wherein the set of signals is transmitted by the base station or the anchor UE, with the first measurement information being based on measurements, by the set of UEs, of the set of signals as reflected off of the target IRS.

19. A position estimation entity, comprising:
a memory;
at least one transceiver; and
at least one processor communicatively coupled to the memory and the at least one transceiver, the at least one processor configured to:
determine a set of position estimates associated with a set of user equipments (UEs);
obtain first measurement information associated with a set of signals as reflected off of a target intelligent reflecting surface (IRS);
determine a position estimate of the target IRS based on the set of position estimates and the first measurement information; and
determine an orientation, relative to a common orientation reference frame, of the target IRS based on the set of position estimates and at least the first measurement information.

20. The position estimation entity of claim 19, wherein the at least one processor is further configured to:
obtain second measurement information, as measured by the set of UEs, that is associated with the set of signals received by the set of UEs as reflected off of a set of IRSs with known locations and orientations relative to the common orientation reference frame.

21. The position estimation entity of claim 19,
wherein the set of UEs comprises a single UE, or
wherein the set of UEs comprises at least a first UE and a second UE.

22. The position estimation entity of claim 19, wherein the at least one processor is further configured to:
configure the target IRS with N surface sections that are each configured to form a wide beam or a set of narrower beams of the set of signals as reflected off of the target IRS, and
wherein the wide beam, the set of narrower beams, or both, are detectable at the set of UEs at respective locations associated with the set of position estimates.

23. A position estimation entity, comprising:
means for determining a set of position estimates associated with a set of user equipments (UEs);
means for obtaining first measurement information associated with a set of signals as reflected off of a target intelligent reflecting surface (IRS);
means for determining a position estimate of the target IRS based on the set of position estimates and the first measurement information; and
means for determining an orientation, relative to a common orientation reference frame, of the target IRS based on the set of position estimates and at least the first measurement information.

24. The position estimation entity of claim 23, further comprising:
means for obtaining second measurement information, as measured by the set of UEs, that is associated with the set of signals received by the set of UEs as reflected off of a set of IRSs with known locations and orientations relative to the common orientation reference frame.

25. The position estimation entity of claim 23,
wherein the set of UEs comprises a single UE, or
wherein the set of UEs comprises at least a first UE and a second UE.

26. The position estimation entity of claim 23,
means for configuring the target IRS with N surface sections that are each configured to form a wide beam or a set of narrower beams of the set of signals as reflected off of the target IRS, and
wherein the wide beam, the set of narrower beams, or both, are detectable at the set of UEs at respective locations associated with the set of position estimates.

27. A non-transitory computer-readable medium storing computer-executable instructions that, when executed by a position estimation entity, cause the position estimation entity to:
determine a set of position estimates associated with a set of user equipments (UEs);
obtain first measurement information associated with a set of signals as reflected off of a target intelligent reflecting surface (IRS);
determine a position estimate of the target IRS based on the set of position estimates and the first measurement information; and
determine an orientation, relative to a common orientation reference frame, of the target IRS based on the set of position estimates and at least the first measurement information.

28. The non-transitory computer-readable medium of claim 27, further comprising computer-executable instructions that, when executed by the position estimation entity, cause the position estimation entity to:
obtain second measurement information, as measured by the set of UEs, that is associated with the set of signals received by the set of UEs as reflected off of a set of IRSs with known locations and orientations relative to the common orientation reference frame.

29. The non-transitory computer-readable medium of claim 27,
wherein the set of UEs comprises a single UE, or
wherein the set of UEs comprises at least a first UE and a second UE.

30. The non-transitory computer-readable medium of claim 27, further comprising computer-executable instructions that, when executed by the position estimation entity, cause the position estimation entity to:
configure the target IRS with N surface sections that are each configured to form a wide beam or a set of narrower beams of the set of signals as reflected off of the target IRS, and
wherein the wide beam, the set of narrower beams, or both, are detectable at the set of UEs at respective locations associated with the set of position estimates.

* * * * *